(12) United States Patent
Morey

(10) Patent No.: US 9,486,927 B1
(45) Date of Patent: Nov. 8, 2016

(54) ROBOTIC GRIPPER WITH MULTIPLE PAIRS OF GRIPPING FINGERS

(71) Applicant: Google Inc., Mountain View, CA (US)

(72) Inventor: Christopher Lynn Morey, Oakland, CA (US)

(73) Assignee: Google Inc., Mountain View, CA (US)

( * ) Notice: Subject to any disclaimer, the term of this patent is extended or adjusted under 35 U.S.C. 154(b) by 6 days.

(21) Appl. No.: 14/717,586

(22) Filed: May 20, 2015

(51) Int. Cl.
*B25J 15/10* (2006.01)
*B25J 15/00* (2006.01)
*B25J 9/16* (2006.01)

(52) U.S. Cl.
CPC .............. *B25J 15/10* (2013.01); *B25J 9/1612* (2013.01); *B25J 15/0028* (2013.01); *Y10S 901/31* (2013.01); *Y10S 901/39* (2013.01)

(58) Field of Classification Search
CPC ..... B23P 19/007; B65G 47/90; B65G 47/91; B65H 67/065; H01L 21/68; H01L 21/68707; B23Q 7/04; B25J 3/00; B25J 3/04; B25J 9/0096; B25J 9/0093; B25J 9/1612; B25J 9/1615; B25J 9/1682; B25J 15/00; B25J 15/00028; B25J 15/0052; B25J 15/0253; B25J 15/10; B25J 15/106; B25J 11/002; B25J 11/0025; B25J 11/0045
See application file for complete search history.

(56) References Cited

U.S. PATENT DOCUMENTS

| 4,062,455 | A | * | 12/1977 | Flatau | ..................... B25J 19/002 414/4 |
| 4,479,673 | A | | 10/1984 | Inaba et al. | |
| 4,626,013 | A | * | 12/1986 | Barrows | .............. B25J 15/0052 294/103.1 |
| 4,697,839 | A | | 10/1987 | Fischer | |
| 6,435,941 | B1 | * | 8/2002 | White | ...................... B23Q 7/04 451/285 |
| 6,612,589 | B2 | | 9/2003 | Saito | |
| 7,654,788 | B2 | | 2/2010 | Rogalla et al. | |
| 8,585,111 | B2 | | 11/2013 | Nammoto et al. | |
| 8,910,985 | B2 | | 12/2014 | Neeper | |
| 8,942,851 | B1 | * | 1/2015 | Maier | ...................... B25J 15/04 700/245 |
| 2006/0182603 | A1 | * | 8/2006 | Hawes | ................. B25J 15/0253 414/735 |
| 2008/0177283 | A1 | * | 7/2008 | Lee | ......................... A61B 34/20 606/130 |
| 2012/0139278 | A1 | * | 6/2012 | Xie | .......................... B25J 15/10 294/207 |
| 2012/0153652 | A1 | * | 6/2012 | Yamaguchi | .......... B25J 15/0028 294/86.4 |
| 2013/0238129 | A1 | * | 9/2013 | Rose | ......................... F04B 9/10 700/258 |
| 2014/0031978 | A1 | * | 1/2014 | Takata | ................. B25J 11/0045 700/245 |
| 2014/0148950 | A1 | * | 5/2014 | Ogawa | .................... B25J 13/02 700/257 |
| 2016/0199979 | A1 | * | 7/2016 | Weitzel | .................. B08B 3/041 134/25.4 |

OTHER PUBLICATIONS

Sam et al., "Design and feasibility tests of flexible gripper for handling variable shape of food products", ISSN: 1790-5117, pp. 329-335.

* cited by examiner

*Primary Examiner* — Nicholas Kiswanto
(74) *Attorney, Agent, or Firm* — McDonnell Boehnen Hulbert & Berghoff LLP

(57) ABSTRACT

Provided herein is a robotic gripper comprising two gripping components, where each component may comprise a rotatable axle oriented along a longitudinal axis, and where the respective axles may be oriented substantially perpendicular to each other. Each component may further comprise a pair of opposing gripping fingers with each gripping finger of the pair being coupled to a respective end of the axle. Each axle may be independently operable to rotate the respective pair of gripping fingers about the longitudinal axis of the respective axle, and each pair of gripping fingers may be independently operable to move the gripping fingers of the respective pair toward and away from each other. A control system for the robotic gripper may thus actuate one or both pairs of gripping fingers to grasp one or more objects.

20 Claims, 15 Drawing Sheets

ROBOTIC GRIPPER WITH MULTIPLE PAIRS OF GRIPPING FINGERS

BACKGROUND

Robotic systems, such as a robotic arm containing a gripping component, may be used for applications involving picking up or moving objects. For instance, a robotic device may be used to create a stack of objects, load objects to a given area, or unload objects from a given area. In some cases, all of the objects that the robotic system is to manipulate may be of the same type. In other cases, such objects may have varying weights and sizes. Further, such robotic systems may direct a robotic arm to pick up objects based on predetermined knowledge of where objects are in the environment. Such robotic systems may also direct a robotic arm to pick up objects based on predetermined knowledge of what types of objects the robotic arm can manage (e.g., based on whether a gripper or other robotic manipulator can support a weight of the object while moving or otherwise interacting with the object at various accelerations).

SUMMARY

Example systems and methods may provide for actuating a robotic gripper that includes two pairs of gripping fingers that are substantially perpendicular to each other. To facilitate adaptable and efficient gripping, such a robotic gripper may employ two degrees of freedom for each pair of gripping fingers and a control system may actuate one pair of gripping fingers independently from the other pair. For instance, the control system may independently actuate each pair of gripping fingers to rotate about a respective axis and/or to open and close its gripping fingers. In operation, such a robotic gripper can be used to pick up and hold multiple objects at once, such as one object held by each pair of gripping fingers or at least one object held between all four gripping fingers.

In one aspect, the present application describes an apparatus. The apparatus may include a first gripping component comprising a first rotatable axle oriented along a first longitudinal axis and further comprising a first pair of opposing gripping fingers with each gripping finger of the first pair being coupled to a respective end of the first axle. The apparatus may further include a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle, where each axle is independently operable to rotate the respective pair of gripping fingers about the longitudinal axis of the respective axle, and where each pair of gripping fingers is independently operable to move the gripping fingers of the respective pair toward and away from each other.

In another aspect, the present application describes a robotic device. The robotic device may include a first gripping component comprising a first rotatable axle oriented along a first longitudinal axis and further comprising a first pair of opposing gripping fingers with each gripping finger of the first pair being coupled to a respective end of the first axle. The robotic device may also include a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle. The robotic device may further include a controller comprising at least one processor and data storage comprising instructions executable by the at least one processor to cause the controller to perform operations. The operations may include causing rotation of one or both pairs of gripping fingers about the longitudinal axis of the respective axle. The operations may also include causing movements of the gripping fingers of one or both pairs of gripping fingers toward each other so as to grasp one or more objects.

In another aspect, the present application describes a method for actuating a robotic apparatus comprising (i) a first gripping component comprising a first rotatable axle oriented along a first longitudinal axis and further comprising a first pair of opposing gripping fingers with each gripping finger of the first pair being coupled to a respective end of the first axle and (ii) a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle. The method may involve receiving data indicative of distinct locations of a first and second object in an environment of the robotic apparatus and further indicative of dimensions of each of the first and second object. The method may also involve, based on the locations and dimensions of the first and second objects, determining respective orientations of each of the first and second pairs of gripping fingers to which to rotate the first and second pairs of gripping fingers about the longitudinal axes of the respective axles, where the respective orientations are orientations such that the first pair of gripping fingers will grasp the first object and the second pair of gripping finger will grasp the second object without contact between the first and second objects. The method may further involve causing the first pair of gripping fingers to rotate to the respective orientation determined for the first pair. The method may still further involve, after rotating the first pair of gripping fingers to the respective orientation, causing movement of the first pair of gripping fingers toward each other so as to grasp the first object. The method may yet still further involve causing the second pair of gripping fingers to rotate to the respective orientation determined for the second pair. The method may yet still further involve, after rotating the second pair of gripping fingers to the respective orientation, causing movement of the second pair of gripping fingers toward each other so as to grasp the second object.

In yet another aspect, a system is provided that includes a means for actuating a robotic apparatus comprising (i) a first gripping component comprising a first rotatable axle oriented along a first longitudinal axis and further comprising a first pair of opposing gripping fingers with each gripping finger of the first pair being coupled to a respective end of the first axle and (ii) a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle. The system may also include a means for receiving data indicative of distinct locations of a first and second object in an environment of the robotic apparatus and further indicative of dimensions of each of the first and second object. The system may further include a means for based on the locations and dimensions of the first and second objects, determining respective orientations of each of the first and second pairs of gripping fingers to which to rotate the first and second pairs of gripping fingers about the longitudinal axes of the respective axles, where the respective orientations are orientations such that the first pair of gripping fingers will grasp the first object and the second pair of gripping finger will grasp the second object without contact between the first and second objects. The system may still further include a means for causing the first pair of gripping fingers to rotate to the respective orientation determined for the first pair. The system may yet still further include a means for, after rotating the first pair of gripping fingers to the respective orientation, causing movement of the first pair of gripping fingers so as to grasp the first object. The system may yet still further include a means for causing the second pair of gripping fingers to rotate to the respective orientation determined for the second pair. The system may yet still further include a means for after rotating the second pair of gripping fingers to the respective orientation, causing movement of the second pair of gripping fingers so as to grasp the second object.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1:
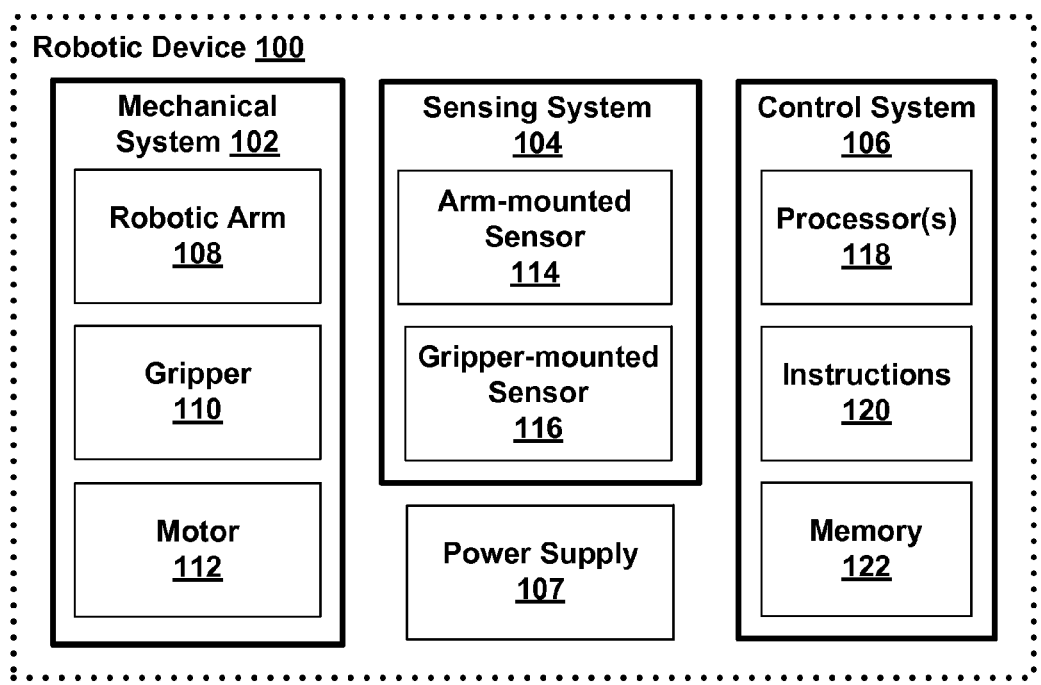
FIG. 1 is an operational block diagram illustrating a robotic device, according to an example implementation.

Example methods and systems are described herein. Any example implementation or feature described herein is not necessarily to be construed as preferred or advantageous over other implementations or features. The example implementations described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other implementations might include more or less of each element shown in a given Figure. Further, some of the illustrated elements may be combined or omitted. Yet further, an example implementation may include elements that are not illustrated in the Figures.

In the following description, the terms "robotic gripper," and "robotic manipulator" may be used interchangeably to refer to a component of a robotic device operable to manipulate objects (e.g., grab, move, drop, etc.)

Further, the terms "workplace" or "workspace" may refer to any physical environment in which boxes or other objects may be manipulated, processed, and/or stored by robotic devices. In some examples, a workplace may be a single physical building or structure. In other examples, a workplace may be an area of a single physical building or structure designated for robotic device operation.

In practice, robotic gripper operation can be limited in various ways. By way of example, some grippers are only able to grasp one object at a time. As another example, the movement of some grippers (and possibly movement of robotic arms attached to such grippers) can be restricted when the gripper is operating in a confined workspace. For instance, the positions at which a gripper can be located in an environment may depend on where in the environment an arm joint to which the gripper is attached is able to move. Therefore, it may be desirable to have a robotic gripper be more adaptive and flexible with its movement and general operation in order to facilitate efficient object manipulation.

As another example, some robotic grippers require movement of a lower joint of the arm in order to view the object that is being grasped. The rotational degree of freedom of this gripper may be close to the object and may allow for better viewing of the object being grasped (via sensors and cameras typically located near the gripper) without requiring movement of lower degrees of freedom that inherently require more torque, power, and time to rotate due to the additional weight need to move the upper arm extremity plus the object weight. Furthermore, having this rotational degree of freedom near the object may speed up the time it takes to rotate the object to a given angle for viewing.

Provided herein is a robotic device including such a gripper apparatus and further including a control system configured to actuate the gripper. Unless otherwise indicated herein, it should be assumed that actuation of the gripper and its various components is controlled either directly or indirectly by such a control system.

In some embodiments, the gripper may include two gripping components oriented substantially perpendicular to each other. More particularly, the gripper may include a first gripping component comprising a first rotatable axle oriented along a first longitudinal axis and further comprising a first pair of opposing gripping fingers with each gripping finger of the first pair being coupled to a respective end of the first axle. The gripper may also include a second gripping component comprising a second rotatable axle oriented along a second longitudinal axis substantially perpendicular to the first longitudinal axis of the first axle (i.e., within a threshold number of degrees from being perpendicular to the first longitudinal axis) and further comprising a second pair of opposing gripping fingers with each gripping finger of the second pair being coupled to a respective end of the second axle.

In operation, each of the two gripping components may have two degrees of freedom. In particular, (i) the axle of each of the two gripping components may be configured to rotate the respective pair of gripping fingers about the longitudinal axis of the respective axle and (ii) the gripping fingers of each pair of gripping fingers may be configured to move toward and away from each other along a certain path (e.g., in order to grasp objects when the fingers are closed and disengage from grasping objects when the fingers are open). Such movement may be linear movement substantially along an path that is substantially parallel to the longitudinal axis of the respective axle, for instance. The freedom of movement of these fingers may enable a variety of finger orientations without necessitating substantial movement of the remainder of the robotic arm.

The control system can perform various operations with respect to such an arrangement for a gripper apparatus. By way of example, the control system can cause the gripper to grasp two objects at once. For instance, one pair of fingers may rotate to a first position to grasp a first object in the workspace, and then once the first object is grasped, that pair of fingers may be rotated out of the way of the other pair of fingers to a second position. In turn, the other pair of fingers can rotate to an optimal position to grasp a second object in the workspace and thus carry the two objects simultaneously. As another example, the control system can cause the gripper to use two or more fingers to grasp objects and then rotate the objects about one or more axes in order to find an optimal position for viewing the objects. Further, the system may perform such an operation without having to move other joints in the robotic arm to which the gripper is attached. As yet another example, the control system can cause the gripper to grasp an object with a first pair of fingers and then use the second pair of fingers to brace the object and prevent any undesired movement of the object and/or undesired force on the first pair of fingers.

Reference will now be made in more detail to various implementations of the robotic device described above, examples of which are illustrated in the accompanying drawings. In the following detailed description, numerous specific details are set forth in order to provide a thorough understanding of the present disclosure and the described implementations. However, the present disclosure may be practiced without these specific details. In other instances, well-known methods, procedures, components, and circuits have not been described in detail so as not to unnecessarily obscure aspects of the example implementations.

FIG. 1 is a functional block diagram illustrating a robotic device 100, according to an example implementation. The robotic device 100 could include various subsystems such as a mechanical system 102, a sensing system 104, a control system 106, as well as a power supply 107. The robotic device 100 may include more or fewer subsystems and each subsystem could include multiple elements. Further, each of the subsystems and elements of robotic device 100 could be interconnected. Thus, one or more of the described operations of the robotic device 100 may be divided up into additional operational or physical components, or combined into fewer operational or physical components. In some examples, additional operational and/or physical components may be added to the examples illustrated by FIG. 1, FIGS. 2A, 2B, 2C, 2D, and 2E, and FIGS. 3-12.

The mechanical system 102 may include components such as a robotic arm 108, a gripper 110, and a motor 112. Motor 106 may be an electric motor powered by electrical power, or may be powered by a number of different energy sources, such as a gas-based fuel or solar power. Additionally, motor 112 may be configured to receive power from power supply 107. The power supply 107 may provide power to various components of robotic device 100 and could represent, for example, a rechargeable lithium-ion or lead-acid battery. Other power supply materials and types are also possible.

The sensing system 104 may use one or more sensors attached to a robotic arm 108, such as sensor 114. The sensing system 104 may also use one or more sensors attached to the gripper 110, such as sensor 116. Within examples, these sensors may include force or torque sensors that can be mounted on the robotic arm and/or gripper and thereby sense forces/torques experienced by the robotic arm and/or by one or more gripping fingers (or other gripping surfaces) of the gripper. Additionally or alternatively, these sensors may include cameras configured to acquire images of the environment of the robotic device. Additionally or alternatively, these sensors may include 2D sensors and/or 3D depth sensors that sense information about the environment as the robotic arm 108 and/or the gripper 110 moves. The sensing system 104 may determine information about the environment that can be used by control system 106 (e.g., a computer running motion planning software) to navigate the robotic arm and/or gripper through the workplace into a position for picking and moving objects efficiently, for instance. The control system 106 could be located on the device or could be in remote communication with the device.

In some arrangements of the robotic device 100, the power supply 107 may supply power to the gripper 110 (e.g., to the fingers or other gripping surface(s) of the gripper) to be transmitted in turn from the gripper to various devices that the gripper is grasping or otherwise in contact with. Within examples, power may be transmitted through the gripper to power specialized tools such as drivers, wrenches, drills, cutters, saws, etc. Within additional examples, the gripper may contact a rechargeable battery or other device in need of power in order to transmit power to that device. To facilitate such a transmission of power in practice, plated contact pads or similar electrical contacts may be present on both the gripper and the devices that the gripper touches, in order to establish an electrical connection between the gripper and those devices.

Many or all of the operations of robotic device 100 could be controlled by control system 106. Control system 106 may include at least one processor 118 (which could include at least one microprocessor) that executes instructions 120 stored in a non-transitory computer readable medium, such as the memory 122. The control system 106 may also represent a plurality of computing devices that may serve to control individual components or subsystems of the robotic device 100 in a distributed fashion. Within examples, control system 106 may be configured to control operation of the gripper 110. Alternatively, the robotic device may include a control system for the gripper that is separate from control system 106 and that is configured to access data from and share data with control system 106.

In some implementations, memory 122 may contain instructions 120 (e.g., program logic) executable by the processor 118 to execute various operations of robotic device 100, including those described in connection with FIGS. 2A, 2B, 2C, 2D, and 2E, and FIGS. 3-12 below.

Memory 122 may contain additional instructions as well, including instructions to transmit data to, receive data from, interact with, and/or control one or more of the mechanical system 102, the sensing system 104, and/or the control system 106.

Figure 2A:
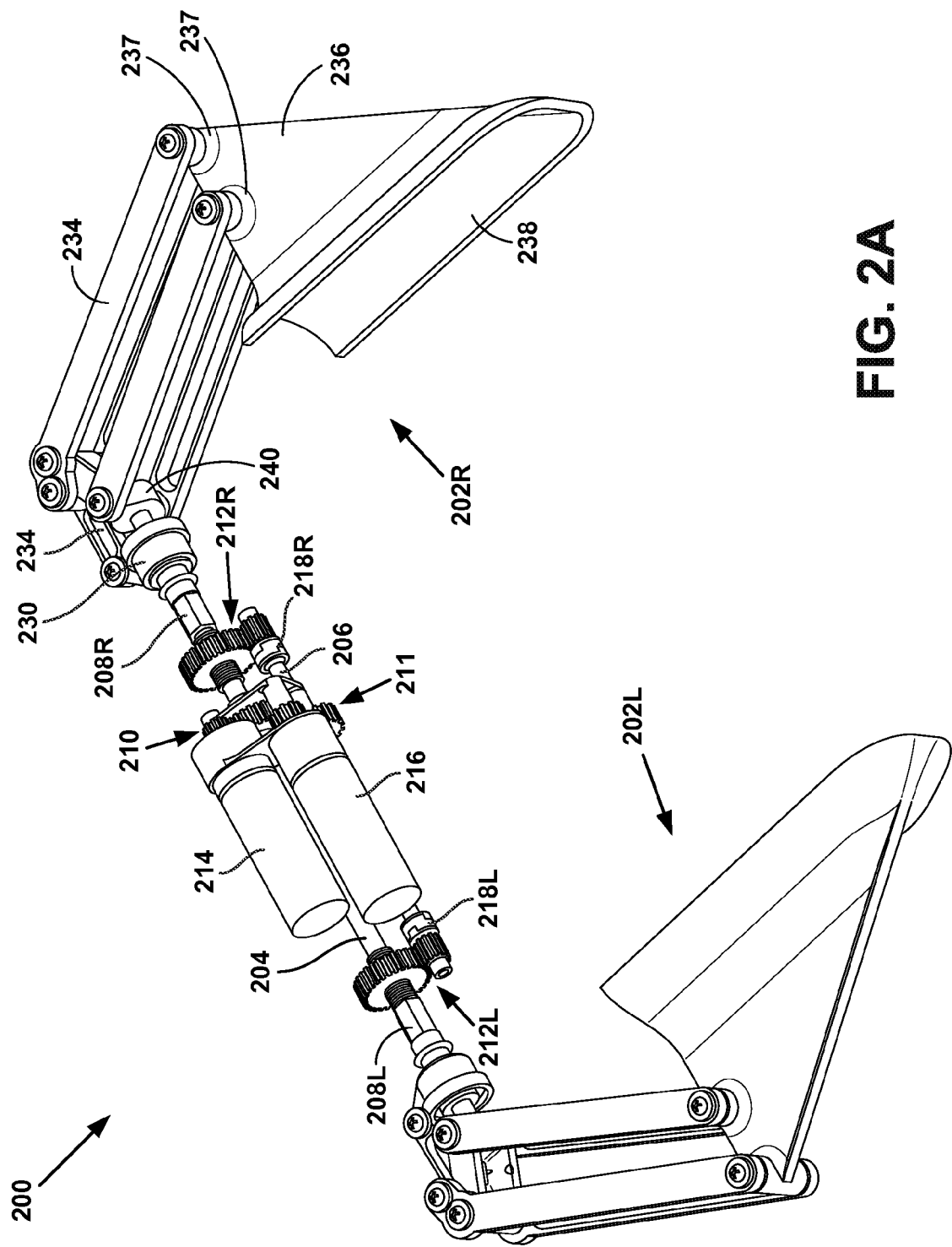
FIG. 2A illustrates a representative component of a robotic gripper, according to an example implementation.

FIG. 2A illustrates a representative component 200 of a robotic gripper, according to an example implementation. In particular, FIG. 2A illustrates one of the two substantially perpendicular pairs of opposing gripping fingers that can be actuated with two degrees of freedom. As shown, the component includes a left finger 202L, a right finger 202R, a large rotatable axle 204, and a small rotatable axle 206. The component also includes a left leadscrew 208L for actuating movement of the left finger 202L towards and away from the opposing right finger 202R, and a right leadscrew 208R for actuating movement of the right finger 202R towards and away from the opposing left finger 202L, each leadscrew surrounding a respective portion of the large axle on the left and right sides. Further, the component includes a first gear train 210 for rotating the large axle 204 and thereby actuating rotational movement of the pair of fingers, a second gear train 211 for rotating the small axle 206 and thereby actuating movement of the opposing fingers towards and away from each other, a left gear train 212L coupled in part to the left leadscrew 208L, and a right gear train 212R coupled in part to the right leadscrew 208R. Still further, the component includes a first motor 214 that drives the first gear train 210 to rotate the large axle 204, and a second motor 216 that drives the second gear train 211 to rotate the small axle 206 and thereby drives the left and right gear trains 212L, 212R and leadscrews 208L, 208R.

Figure 2B:
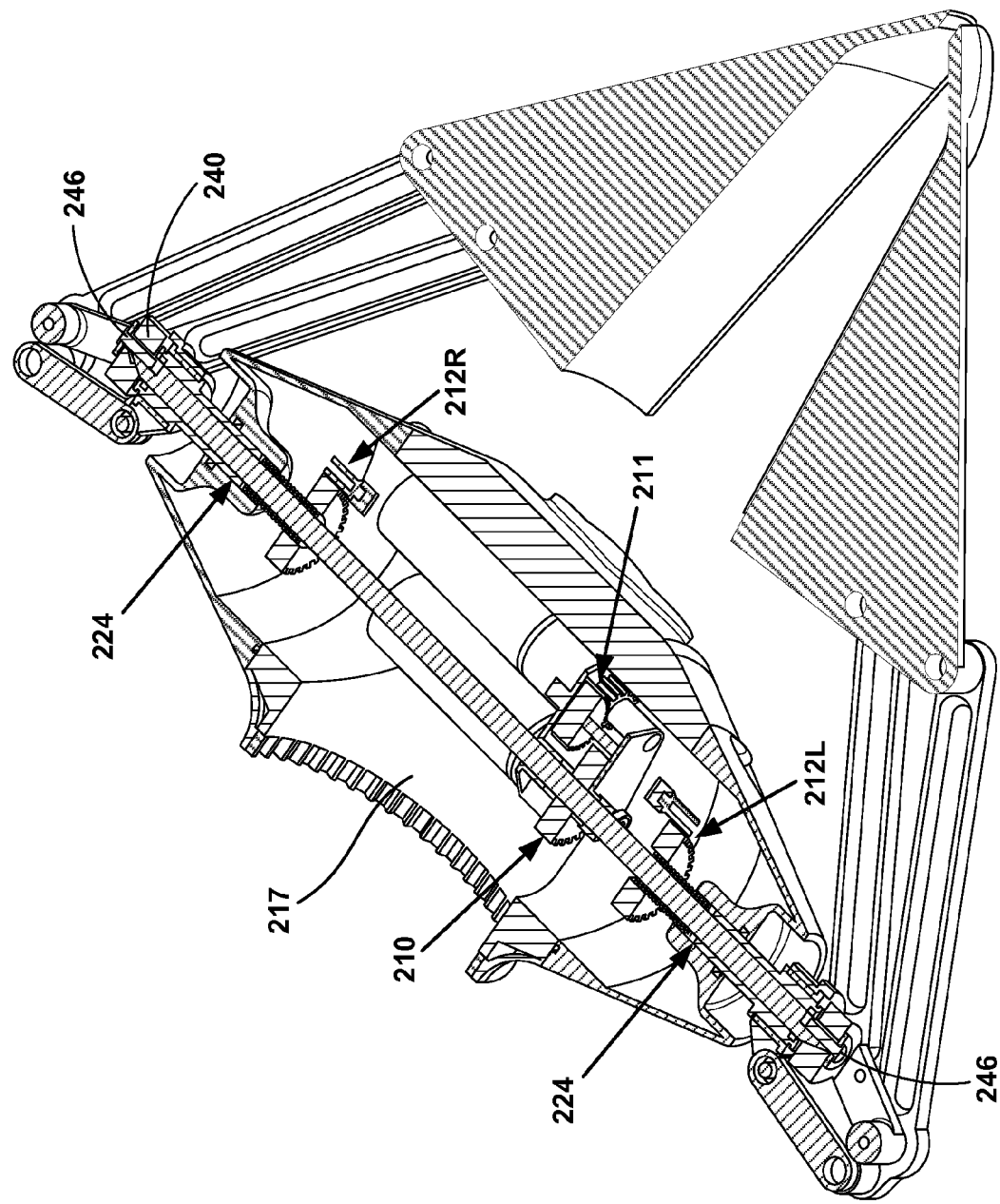
FIG. 2B illustrates a cross-sectional view of the component of FIG. 2A, according to an example implementation.

A cross-sectional view of the elements noted above, as well as other elements of the component 200, are shown in FIG. 2B. Also shown in FIG. 2B is a housing 217 that encloses a portion of the component 200.

Further, as shown in FIGS. 2A and 2B, each of the left and right gear trains 212L, 212R include a large gear that is attached around the respective leadscrew and a pinion that is coupled to the small axle 206 and that drives rotation of the large gear. The large gear may include grooves that mate with grooves of the leadscrew such that when the large gear rotates, the leadscrew will not rotate, but rather move linearly along the longitudinal axis of the large axle 204. In this manner, the leadscrew may translate rotational motion of an actuator coupled to the leadscrew (e.g., the large gear of the left and right gear trains) into linear motion of the leadscrew. Still further, proximate to each pinion is a respective component 218L, 218R, such as an Oldham coupling, arranged to substantially correct axial and/or angular misalignment of the small axle 206. Alternative components can be used to correct misalignment as well.

Figure 2C:
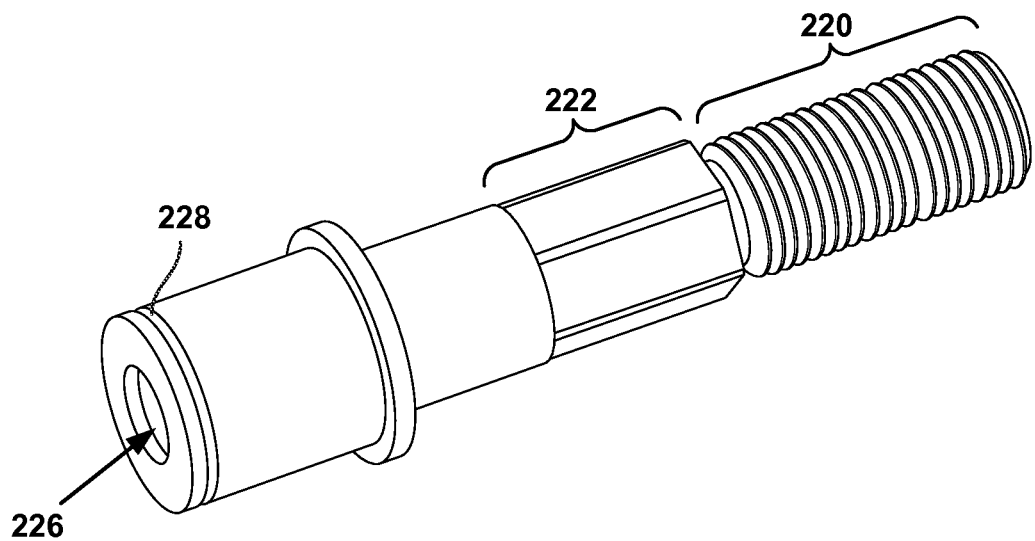
FIG. 2C illustrates an element of the component of FIG. 2A, according to an example implementation.

A closer view of such a leadscrew is illustrated in FIG. 2C. As shown in FIGS. 2A, 2B, and 2C, the left and right leadscrews 208L, 208R are identical and oriented opposite to one another. However, in other implementations, each leadscrew may take different forms. Further, as shown, a portion of the leadscrew includes grooves 220 that mate with the grooves of the large gear, as discussed above. The leadscrew also includes an intermediate portion having a hexagonal shape. In practice, this hexagonal portion 222 may contact and be enclosed tightly by a portion 224 of the housing 217 of the component 200, as shown in FIG. 2B. In this manner, these portions 224 may prevent the leadscrews from rotating. The housing may enclose other portions of the leadscrew as well, in some implementations. Further, the leadscrew includes a hollowed area 226 within the leadscrew through which the large axle 204 may slidably pass. Still further, the leadscrew include a retainment groove 228 operable to help fasten the leadscrew to other elements of the respective gripping finger, such as a push rod bushing.

Figure 2D:
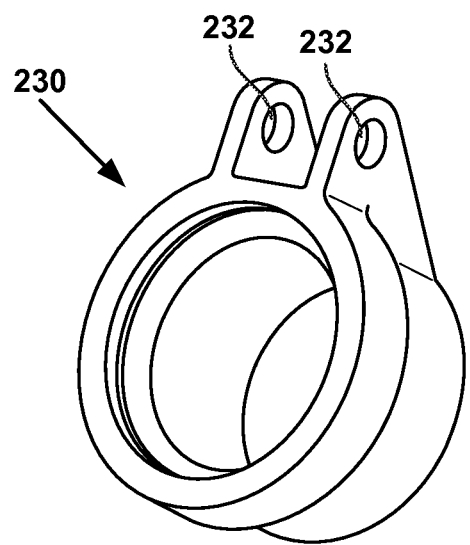
FIG. 2D illustrates an element of the component of FIG. 2A, according to an example implementation.

A closer view of such a push rod bushing 230 is illustrated in FIG. 2D. Further, as shown in FIGS. 2A and 2B, a respective push rod bushing 230 may surround and be fastened to the retainment groove end of the respective leadscrew. The push rod bushing may surround and be securely fastened to the leadscrew in a manner where the push rod bushing is operable to rotate about the longitudinal axis of the large axle 204 along with the remainder of the pair of fingers when such actuation occurs. Still further, as shown in FIG. 2D, the push rod bushing may include two openings 232 through which a screw or other fastener may pass in order to couple the push rod bushing to other elements of the respective gripping finger. For instance, as shown in FIG. 2A, such a fastener may coupled the push rod bushing to various linkages 234 that connect elements proximate to the end of the large axle to the respective tip 236 of the gripping finger. The push rod bushing may be oriented in a certain way that allows it to transfer its own linear motion to rotational motion of linkages 234 as well as rotational motion of the tip 236 of the gripping finger during operation. For instance, as shown in FIGS. 2A and 2B, the push rod bushing may be oriented such that an axis that runs through the openings of the push rod bushing is substantially perpendicular to the longitudinal axis of the large axle.

As shown in FIG. 2A, the linkages that connect the tip 236 to other elements of the respective gripping finger may take the form of a four-bar arrangement. Within other examples, however, the linkages may be arranged in other manners between the tip of the respective gripping finger and the other elements. With the arrangement shown, as well as with other possible arrangements, the linkages may pivot when force is applied from the push rod bushing 230.

Furthermore, as shown in FIG. 2A, the gripping finger tip 236 may include mounting points 237 for various linkages 234 and may further include a gripping surface 238. The gripping surface may take various forms and may include adhesive and/or non-adhesive elements. Further, the gripping surface (or the gripping finger in general, for that matter) may be compliant, meaning that the surface (or at least a portion of the finger) may be arranged to form to the contour of the object being grasped by the gripper, which might prevent slippage of the object and/or provide other advantages during manipulation of objects. As shown in FIG. 2A, the gripping surfaces have curved faces, although other shapes are possible as well, such as planar faces. Within other examples, the gripping surfaces may contain dimpled patterns of compliant urethane pads or similar compliant material.

Figure 2E:
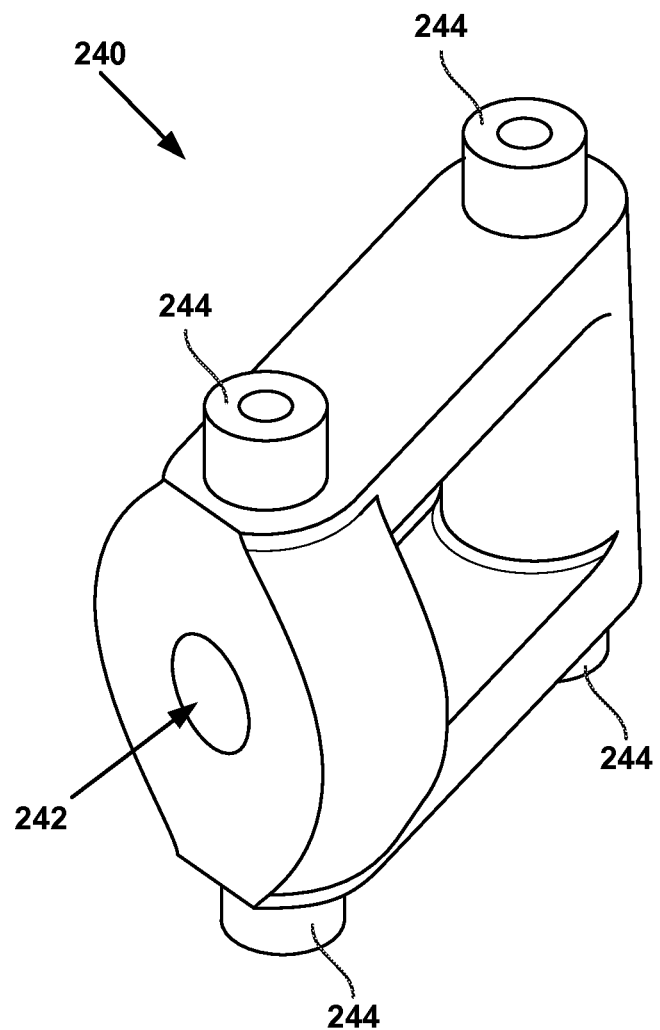
FIG. 2E illustrates an element of the component of FIG. 2A, according to an example implementation.

Moreover, as shown, each gripping finger may include an axle end cap 240 that houses a respective end of the large axle and that is operable to transmit torque from rotations of the axle to rotations of the respective finger. A closer view of such an axle end cap 240 is illustrated in FIG. 2E. As shown in FIG. 2E, the axle end cap may include a hollow chamfered opening 242 and multiple mounting points 244 for various linkages of the respective gripping finger. In practice, the respective end of the large axle may be chamfered as well and the chamfered opening of the axle end cap may house the respective chamfered end of the large axle. Further, as shown in FIG. 2B, a screw 246 or other object may be inserted into the chamfered opening to compress the respective end of the large axle against the axle end cap 240. In this manner, the axle end cap may be mounted to the respective end of the large axle and torque from the first motor's gear train 210 can be transferred to the respective finger with minimal to no backlash during rotation.

As discussed above, the pair of gripping fingers 202L, 202R may be actuated with two degrees of freedom. One degree of freedom may include a rotation of the fingers. In operation, for instance, when the first motor 214 drives the first gear train 210 to rotate the large axle 204, the rotation of the large axle may cause rotation of the pair of gripping fingers about the longitudinal axis of the large axle that is substantially in sync with the rotation of the large axle. To facilitate this, the axle end cap 240 that houses the respective end of the large axle may transmit torque from rotations of the axle to rotations of the respective finger, as noted above.

Within examples, this rotational motion of each gripping finger may be in the same direction and may be substantially synchronous (i.e., rotation of the large axle drives rotation of both fingers coincident in time). Within other examples, however, such as examples where each individual finger is actuated independently, the rotational motion of each finger may by nonsynchronous (i.e., out of phase with each other). Within additional examples, one finger may be actuated to rotate in one direction and another finger may be actuated to rotate in the opposite direction.

Another degree of freedom may include a movement of the opposing gripping fingers toward and away from each other along a certain path. This movement may be along a substantially linear path, for instance, such that the opposing gripping surfaces of the opposing fingers move towards and away from each other along the substantially linear path. In operation, for instance, when the second motor 216 drives the second gear train 211 to rotate the small axle 206, the rotation of the small axle may drive rotation of the gear trains 212L, 212R at the left and right ends of the small axle, which in turn drives the left and right leadscrews 208L, 208R to move linearly along the large axle either (i) away from each other along the large axle 204 when the small axle rotates in one direction or (ii) toward each other along the large axle when the small axle rotates in the opposite direction. Further, this linear force from the leadscrews in either direction may translate to linear force from the respective push rod bushings, and the linear force from the push rod bushings may then translate into rotational motion of the linkages about axes that are substantially perpendicular to the longitudinal axis of the large axle. Namely, the linkages may pivoting about various mounts and fasteners of the respective bushings and axle end caps. This rotation by the linkages may in turn cause the pair of gripping fingers (or more particularly, the gripping finger tips) to move toward or away from each other along a certain path.

Within examples, this linear motion of each leadscrew may be substantially synchronous (i.e., rotation of the small axle drives linear motion of both leadscrews coincident in time). Within other examples, however, such as examples where each individual finger is actuated independently, the linear motion of each leadscrew may by nonsynchronous. Within additional examples, one or more mechanical elements may be present in one finger that are not present in the other finger that allow the one finger to move nonsynchronous from the other finger.

Within additional examples, as noted above, the path along which the opposing fingers are configured to move in order to grasp and release objects may be substantially linear, or may be non-linear (e.g., a curved, arced path).

Within additional examples, the opposing fingers of the pair may be nearly parallel, but may comprise gripping tips with angled ends/tips. Within such examples, when the fingers are moved towards each other to grasp an object, the angled tips may contact an object before any other portion of the gripping surfaces contact the object. In this manner, force can be applied at these tips to grasp small and/or thin objects (e.g., a pin, paper). This manner of gripping with angled tips is preferable to pick up such small and/or thin objects, since it may be difficult or impossible to pick up such objects with gripping tips that were parallel to each other or otherwise arranged so that a portion of the gripping tip other than the ends contacted such objects first.

It should be noted that other grippers may include more or less components than those that are shown in FIGS. 2A, 2B, 2C, 2D, and 2E. For instance, in other implementations, the gripper may include more or less motors, gears, and/or axles. Additionally or alternatively, the number of linkages may vary depending on the kinematics and grip force that is required to have the gripper perform a particular task. For instance, in some arrangements, the linkages may be eliminated, and the gripping tips and/or other components may be coupled directly or almost directly to the axle(s). Overall, such additional or reduced components may drive operations of the gripper described herein or perhaps other operations of the gripper not described herein. By way of example, such components may serve to drive individual actuation of each separate finger independently from other fingers, including substantially linear actuation of an individual finger and/or rotational actuation of the individual finger. Other operations are possible as well.

It should also be noted that while the gripping fingers are shown to be substantially symmetrical and including the same elements, each gripping finger may include one or more elements different from the other gripping finger.

Figure 3:
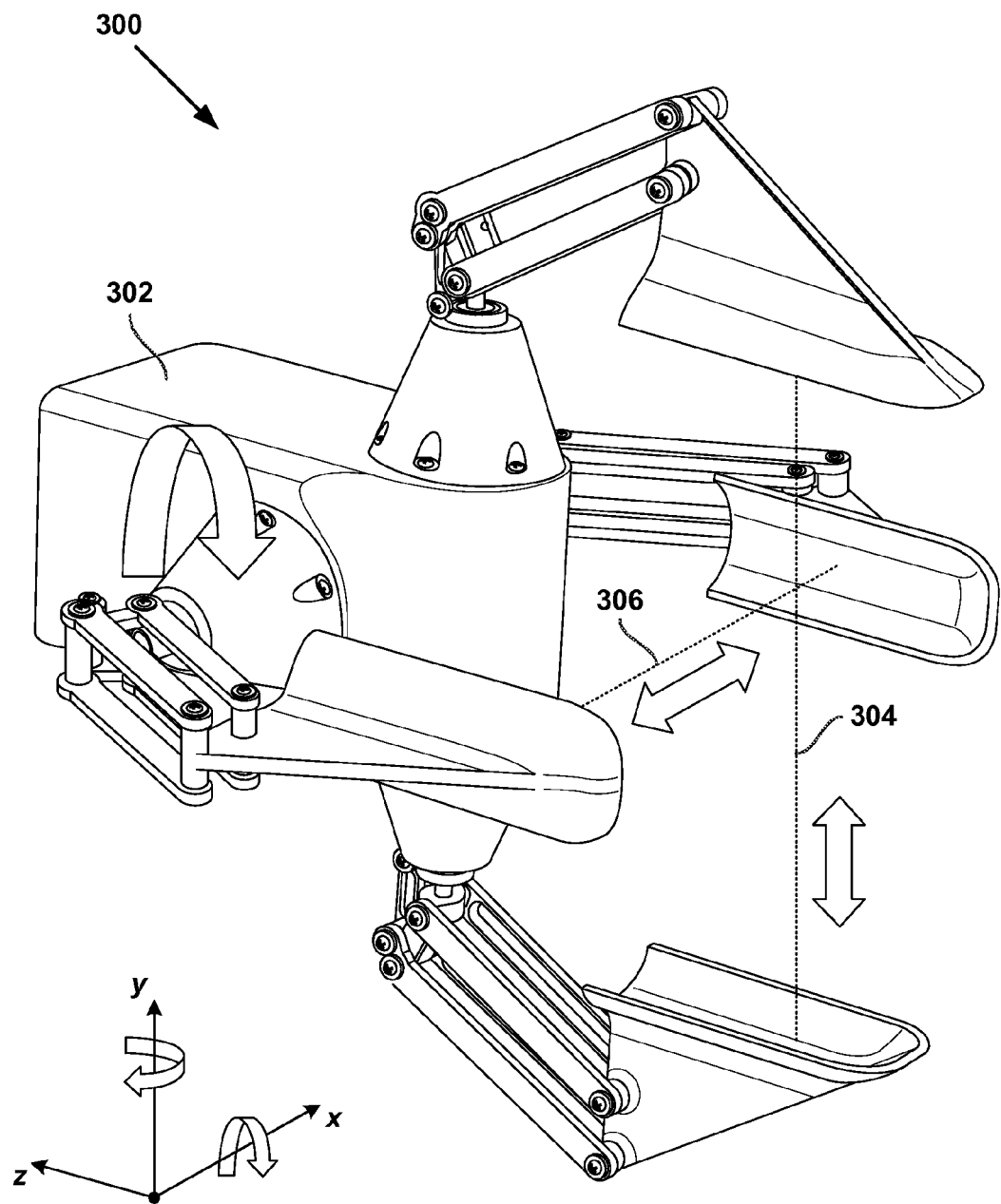
FIG. 3 illustrates a robotic gripper, according to an example implementation.

FIG. 3 illustrates a robotic gripper 300, according to an example implementation. In particular, FIG. 3 illustrates two gripping components similar to component 200 of FIGS. 2A and 2B, each component having a respective pair of gripping fingers. As shown, these two gripping components are mounted substantially perpendicular to each other such that the longitudinal axes of their respective large axles are substantially perpendicular. One gripping component is shown to be oriented along the y-axis and another gripping component is shown to be oriented along the x-axis.

Further, FIG. 3 shows a portion of a robotic arm 302 coupled to the two gripping components and extending away from the two gripping components along the z-axis. This portion of the robotic arm (in addition to or alternative to housing 217 shown in FIG. 2B) may serve as a housing for at least a portion of the two gripping components. In practice, this housing may be sealed such that the robotic gripper will not be damaged or otherwise negatively affected by outside exposure, such as dust or submergence in various liquids (e.g., water). Further, this housing may at least partially enclose and protect various electronics, circuitry, tubing, etc. For instance, the housing of one or both of the gripping components may include various openings and allow for wires (not shown) to run through the interior of the housing and out these openings. Additionally or alternatively, such wires and other electronics may be coupled on an exterior surface of the housing. In either implementation, wires may run along at least a portion of the length of the gripping fingers and couple to various sensors that are located on the gripping fingers, such as force/sensors, cameras, etc., as noted above. With the gripper arrangement shown in FIG. 3, movement of the gripping fingers may substantially coincide with movement of the wires coupled along the fingers without causing such wires to tangle or interfere with gripper movement.

It should be understood that while the pairs of gripping fingers are shown to be identical, in other implementations the pairs may be different. Within examples, the fingers of one pair may be longer, have different geometry, or otherwise be different than the fingers of the other pair, such that the kinematics of their respective movements differ to suit different requirements associated with each pair. For instance, a longer pair of fingers may be dedicated for, or otherwise typically used for, grasping and handling larger objects. To facilitate this in practice, the gear ratio associated with actuating the longer pair of fingers may differ from the gear ratio associated with actuating the other pair of fingers such that the longer pair of fingers has more gripping force and/or rotational torque than the other pair of fingers. Within additional examples, the fingers of one pair may include different gripping surfaces than the fingers of the other pair. Other examples are possible as well.

In line with the discussion above, the control system may actuate rotational movement of a first pair of gripping fingers and/or movement of the opposing fingers of the first pair towards and away from each other independently from rotational movement of a second pair of gripping fingers and/or movement of the opposing fingers of the second pair towards and away from each other. To facilitate this, each large axle may be independently operable to rotate the respective pair of gripping fingers about the longitudinal axis of the respective axle, and each small axle may be independently operable to rotate and cause the gripping fingers of the respective pair to move toward and away from each other. In particular, as shown, the control system can rotate the first pair of gripping fingers about the y-axis, and at the same time or at a different time, the control system can rotate the second pair of gripping fingers about the x-axis. Further, the control system can move the first pair of gripping fingers toward or away from each other along a respective path, such as a linear path that is parallel to the y-axis (e.g., path 304), and at the same time or at a different time, the control system can move the second pair of gripping fingers toward or away from each other along a respective path, such as a linear path that is parallel to the x-axis (e.g., path 306).

Within examples, the control system may be configured to limit rotation of one or both pairs of gripping fingers over a predetermined, adjustable range. In this manner, for instance, the pairs of gripping fingers may avoid any contact with the robotic arm that could cause damage to the arm. Likewise, with respect to movement of opposing fingers towards and away from each other, the control system may also be configured to limit this type of movement of one or both pairs of gripping fingers over a predetermined, adjustable range. In this manner, for instance, each gripping finger may avoid contact with the opposite gripping finger. Within other examples, the two gripping components may include various mechanical elements that limit rotation and/or substantially linear movement in this way. Within additional examples, the control system may time movements of each pair of gripping fingers so that movements of one pair of gripping fingers do not interfere with movements of the other pair of gripping fingers. For at least this reason, the control system may consider the position of one pair of gripping fingers when determining the position of another pair of gripping fingers.

As discussed above, a control system can control a robotic gripper that employs these two degrees of freedom, such as robotic gripper 300, to perform various operations, such as causing the robotic gripper to pick up and grasp one or more objects in the workspace. FIGS. 4-12 describe and illustrate examples of such operations.

In operation, it may be advantageous for the control system to determine or receive various information associated with the object(s) at issue, such as the locations, dimensions, weights, centers of mass, etc. of the object(s), in order to help the control system determine how to actuate the robotic gripper and/or other aspects of the robotic device to perform certain tasks. Within examples, the control system may use such information to determine which pair(s) of gripping fingers (e.g., one pair, both pairs, or no pairs) are suitable for picking up the object(s). For instance, the control system may determine whether one or both pairs are needed to handle the size of the object(s) and the force that the object(s) will exert on the gripper fingers, on the arm, etc. In addition, the control system may determine degrees and/or speeds of rotation of the pair(s) of gripping fingers based on how much force and torque the control system knows the gripping fingers can handle. And in some scenarios, depending on the size of one object that is held by the first pair of gripping fingers, the control system may not allow the second pair of gripping fingers to grasp another object.

Further, with the freedom that the disclosed gripper provides, a control system can dynamically adjust movement of the gripper based on changing conditions in the environment, such as the weight of the object shifting while the object is being moved, obstacles present in the environment as the gripper is navigated through the environment from one location to another, among other possibilities. To facilitate this, force sensors, torque sensors, cameras, etc. of the robotic device may keep the control system informed of (i) what force/torque is exerted on the finger(s), (ii) where in the environment the gripper is located, (iii) what obstacles are present in the environment, etc.

Figure 4:
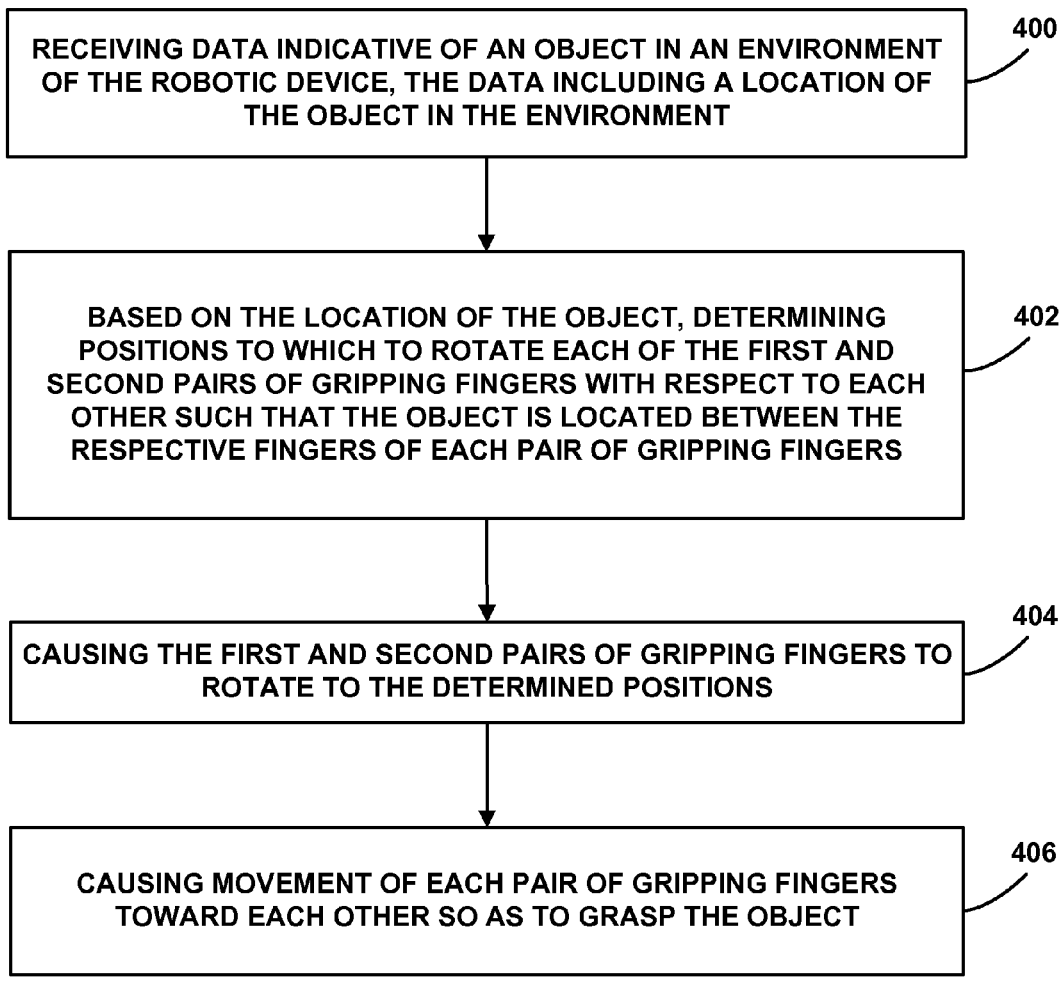
FIG. 4 is a flow chart of an example method, in accordance with at least some implementations described herein.

FIG. 4 is a flow chart of an example method for controlling a robotic gripper to pick up and grasp an object. The method shown in FIG. 4 presents an implementation of a method that, for example, could be used with the system shown in FIG. 1 and/or with the systems and apparatuses shown in FIGS. 2A, 2B, 2C, 2D, 2E, and/or 3, for example, or may be performed by a combination of any components of in these figures. In addition, such an implementation of a method could be carried out in accordance with the systems and aspects illustrated in FIGS. 5-12. The method may include one or more operations, or actions as illustrated by one or more of blocks 400, 402, 404, and 406. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method and other processes and methods disclosed herein, the flowchart shows operation of one possible implementation of present implementations. In this regard, each block may represent a module, a segment, or a portion of program code, which includes one or more instructions executable by one or more processors for implementing specific logical operations or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 4 may represent circuitry that is wired to perform the specific logical operations in the process.

Operations of this example method, and operations of other methods and processes disclosed herein, may be performed at least in part by a control system configured control a robotic device and/or other components or subsystems (e.g., sensors or another type of robotic vision system located remotely from the system) that are associated with the robotic device, such as control system 106 and/or other subsystems of robotic device 100 described above.

At block 400, the control system receives data indicative of an object in an environment of the robotic device, the data including a location of the object in the environment. Within examples, the data may be based at least in part on information obtained by a vision system of the robotic device and/or by a system configured to store and maintain a location of the object. Further, the data may include a 2D image or 3D model of the environment that indicates where in the environment the object is located. Still further, the data may include coordinates of the object. Yet still further, the data may include dimensions of the object and/or a weight of the object, as noted above.

At block 402, the control system determines, based on the location of the object, positions to which to rotate each of the first and second pairs of gripping fingers with respect to each other such that the object is located between the respective fingers of each pair of gripping fingers.

In some implementations, the positions to which the control system moves each pair of gripping fingers may be based on other considerations as well. By way of example, the positions may be based at least in part on other information included in the received data, such as the dimensions of each object. Accordingly, the distance at which the control system separates each pair of gripping fingers may be based on how much space is needed between the gripping fingers for the object, for instance. As another example, the positions to which the control system moves each pair of gripping fingers may be based at least in part on locations of other objects in the environment. To facilitate this, the control system may receive other data indicative of the surrounding environment of the gripper through which the gripper will need to navigate in order to approach and grasp the object without interfering with (e.g., contacting) certain other objects in the environment. In this manner, if the gripper is navigating a tight space to grasp the object, for instance, the control system may not separate the gripping fingers too far apart and/or may not rotate the gripping fingers to a degree where the fingers might contact other objects. Other examples are possible as well.

Within examples, the control system may receive the data before the gripper is near the object and may thus determine or estimate these positions as part of a process in which the control system plans in advance a task for the robotic device to complete. Within other examples, the data may be based at least in part on information obtained by sensors coupled to the gripper itself, and thus the control system may not determine or estimate these positions until the gripper is close enough to the object to properly obtain this information.

At block 404, the control system causes the first and second pairs of gripping fingers to rotate to the determined positions. And at block 406, the control system causes movement of each pair of gripping fingers toward each other so as to grasp the object. Such movement of one or more pairs of gripping fingers may occur before the gripper is near the object or once the gripper is within a predefined threshold distance of the object.

Figure 5:
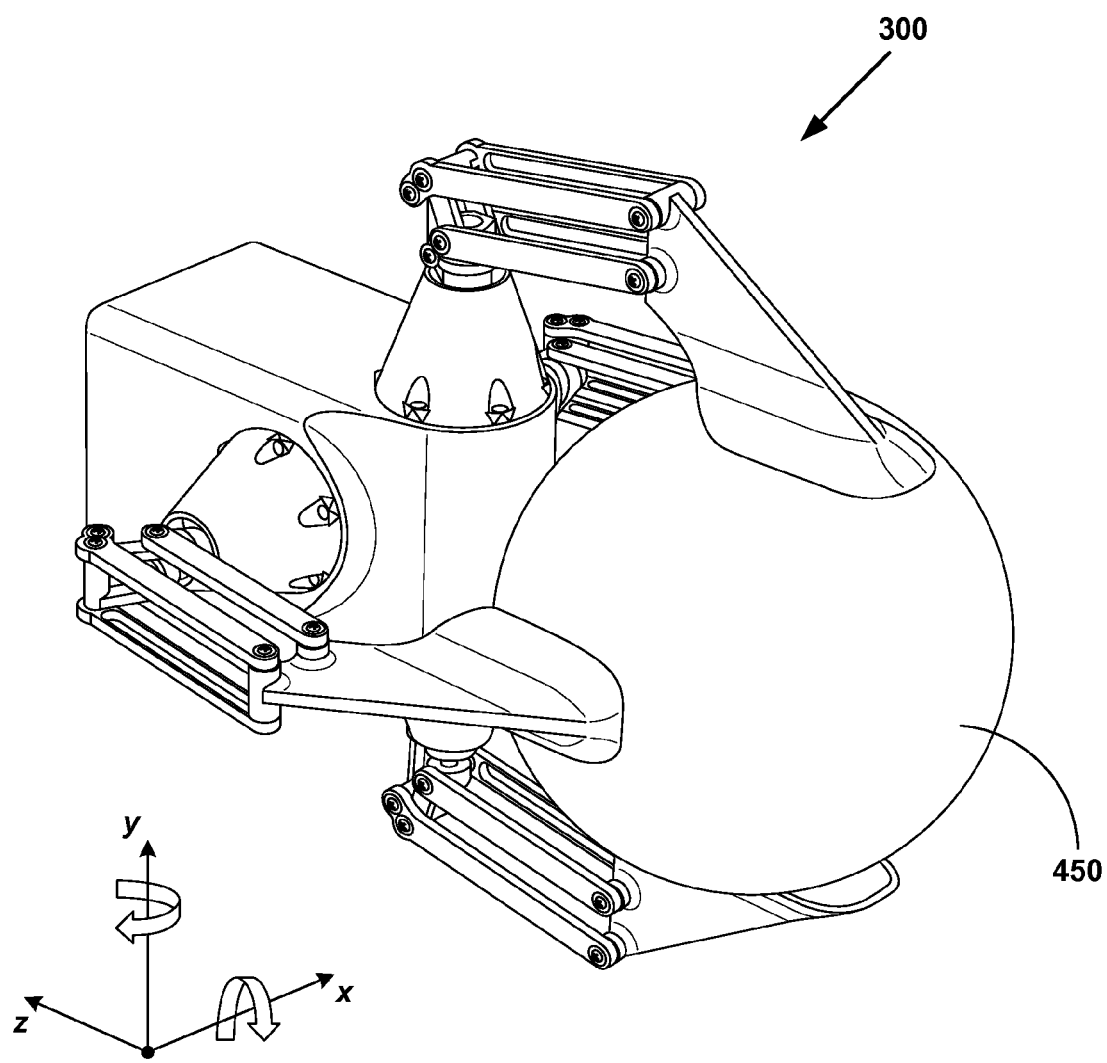
FIG. 5 illustrates a robotic gripper in operation, according to an example implementation.

In line with the discussion above, FIG. 5 illustrates a robotic gripper 300 that is grasping an object 450. Prior to grasping the object, the control system may have oriented the gripping fingers such that when they clamped together, they grasp the object as shown. The control system may then cause the gripper to engage in grasping the object by (i) actuating the first pair of gripping fingers to move toward each other (e.g., move substantially along an axis parallel to the y-axis) and (ii) actuating the second pair of gripping fingers to move toward each other (e.g., move substantially along an axis parallel to the x-axis). Although object 450 is shown as spherical, it should be understood that objects with other shapes can be grasped as well.

Other variations of the example method of FIG. 4 are possible as well. For instance, the control system may actuate only a single pair of gripping fingers to grasp one or more objects between them. Further, the control system may actuate the other pair of gripping fingers to move out of the way of the objects and/or to brace the objects either by resting the other pair of fingers against the object(s) with strong, minimal, or no force. This bracing action may serve various purposes, such as balancing the object(s) so that the object(s) do not exert any undesired force on the gripping fingers. Herein, to "brace" an object refers to pushing or leaning respective side(s) of one or both of the gripping tips against the object, as opposed to gripping or grasping the object between the respective gripping surfaces of the gripping tips.

Figure 6:
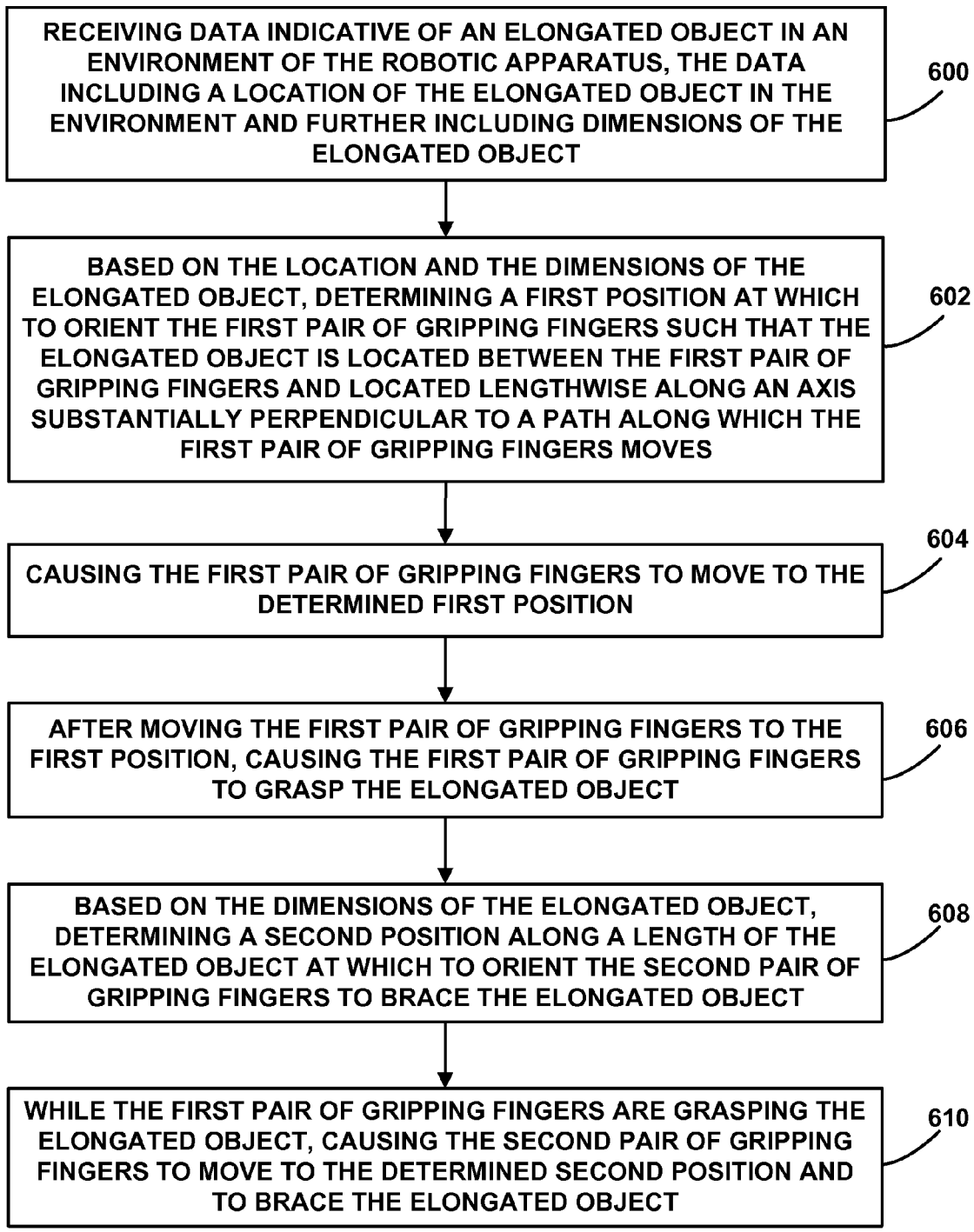
FIG. 6 is a flow chart of an example method, in accordance with at least some implementations described herein.

Along these lines, FIG. 6 is a flow chart of an example method for controlling a robotic gripper to pick up and grasp an elongated object. At block 600, the control system receives data indicative of an elongated object in an environment of the robotic apparatus, the data including a location of the elongated object in the environment and further including dimensions of the elongated object. At block 602, the control system determines, based on the location and the dimensions of the elongated object, a first position at which to orient the first pair of gripping fingers such that the elongated object is located between the first pair of gripping fingers and located lengthwise along an axis substantially perpendicular to a path along which the first pair of gripping fingers moves (e.g., path 304, as shown in FIG. 3). At block 604, the control system causes the first pair of gripping fingers to move to the determined first position. And at block 606, after moving the first pair of gripping fingers to the first position, the control system causes the first pair of gripping fingers to grasp the elongated object.

Figure 7:
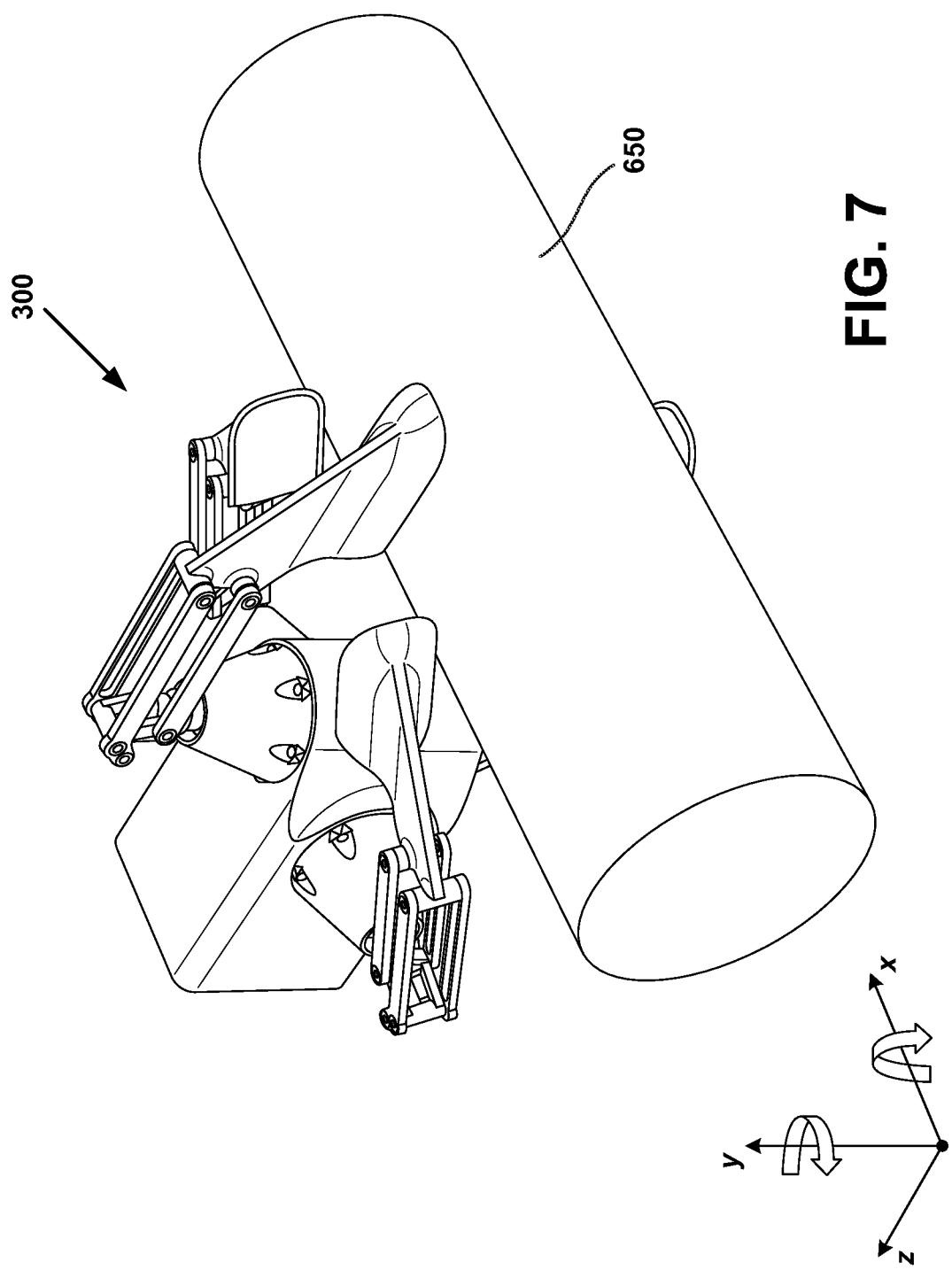
FIG. 7 illustrates a robotic gripper in operation, according to an example implementation.
Figure 8:
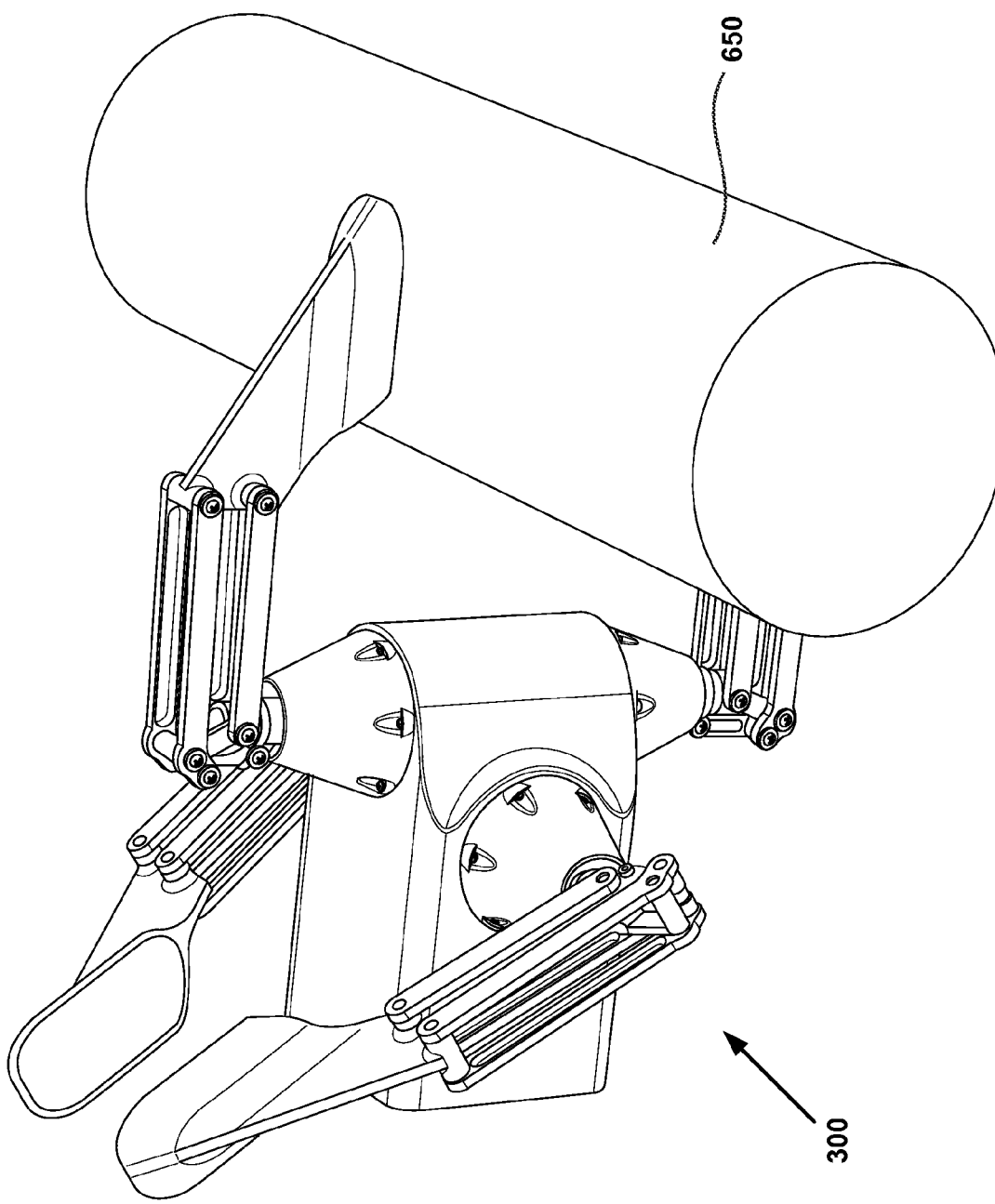
FIG. 8 illustrates a robotic gripper in operation, according to an example implementation.

As shown in FIGS. 7 and 8, for instance, the elongated object 650 is oriented lengthwise along an axis parallel to the x-axis. Further, the control system oriented the first pair of gripping fingers of the gripper 300 such that when the gripping fingers moved together in the y-direction to grasp the elongated object 650, the fingers contacted the elongated object at approximately the center of the elongated object.

At some point before, during, or after, the actuation of the first pair of gripping fingers, the control system may rotate the second pair of gripping fingers about the x-axis in the y- and z-directions away from the elongated object so that the second pair of gripping fingers does not interfere with actuation of the first pair of gripping fingers. An example of this is shown in FIG. 8.

However, as noted above, the control system could also use the second pair of gripping fingers to brace the elongated object and balance it so that its weight does not twist the gripping fingers or otherwise exert any undesired force on the gripper. Accordingly, at block 608, the control system determines, based on the dimensions of the elongated object, a second position along a length of the elongated object at which to orient the second pair of gripping fingers to brace the elongated object. And at block 610, while the first pair of gripping fingers are grasping the elongated object, the control system causes the second pair of gripping fingers to move to the determined second position and to brace the elongated object. The control system may also take into account the weight of the object and the center of mass of the object when determining the locations at which to place the second pair of gripping fingers.

Figure 9:
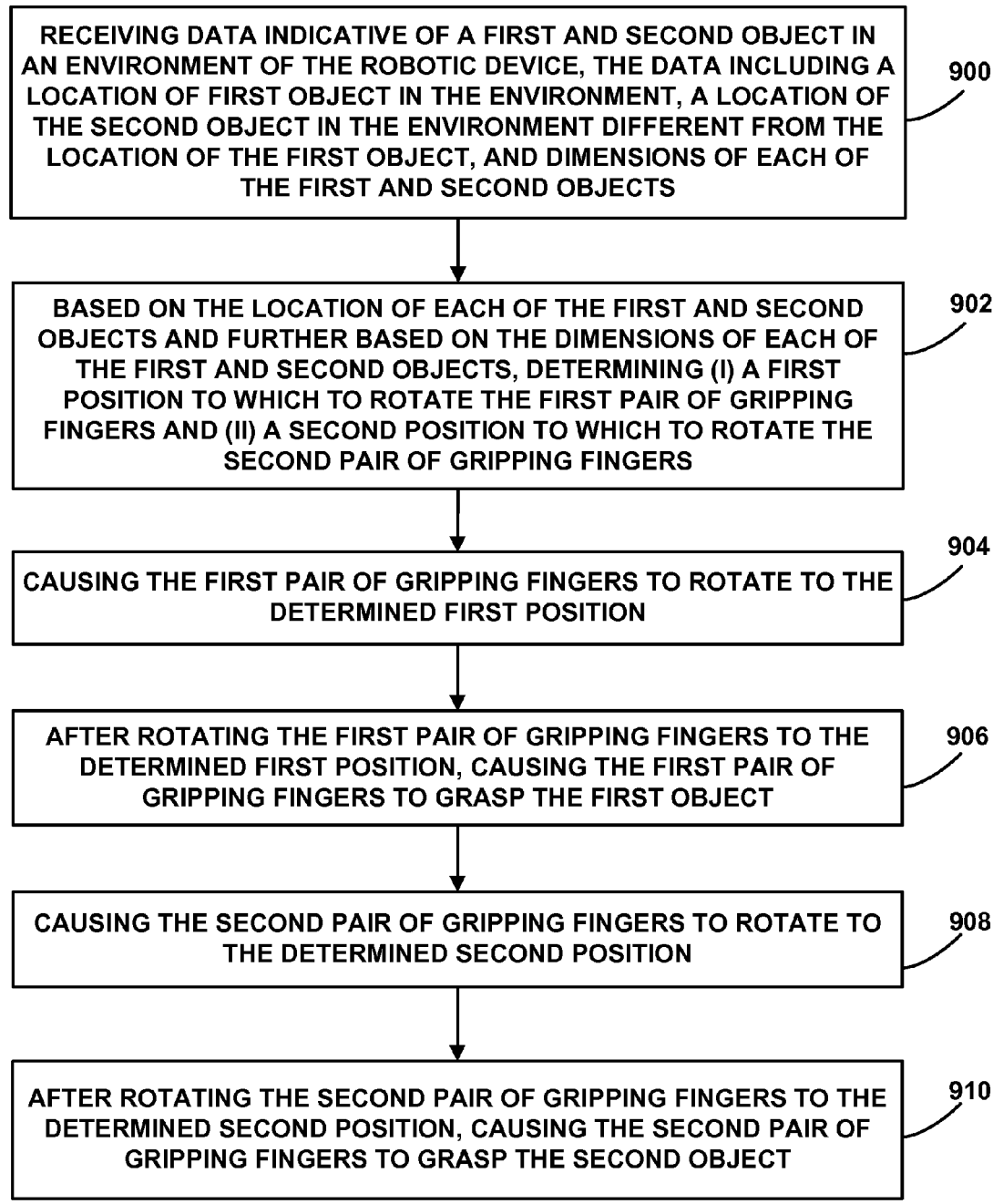
FIG. 9 is a flow chart of an example method, in accordance with at least some implementations described herein.

Operations relating to grasping multiple objects will now be discussed in more detail. FIG. 9 is a flow chart of an example method for controlling a robotic gripper to grasp a first object with a first pair of gripping fingers and while the first pair of gripping fingers is grasping the first object, grasp a second object with a second pair of gripping fingers.

At block 900, the control system receives data indicative of a first and second object in an environment of the robotic device, the data including a location of first object in the environment, a location of the second object in the environment different from the location of the first object, and dimensions of each of the first and second objects. The first object may be located proximate to the second object, inside the second object, and/or at a separate distinct location that is a threshold distance away from the second object. The objects may have identical, similar, or different shapes, weights, dimensions, etc.

At block 902, the control system determines, based on the location of each of the first and second objects and further based on the dimensions of each of the first and second objects, (i) a first position to which to rotate the first pair of gripping fingers and (ii) a second position to which to rotate the second pair of gripping fingers. Within examples, these positions may be determined such that the first pair of gripping fingers will grasp the first object and the second pair of gripping finger will grasp the second object without contact between the first and second objects. In this manner, the action of the second pair of gripping fingers grasping the second object will not interfere with the first object that is either already being held, or in the process of being picked up, by the first pair of gripping fingers at the time the second object is picked up. This may be advantageous, for instance, in that the gripper has the flexibility to reorient one pair of gripping fingers without risk of dislodging the object that is grasped by the other pair of gripping fingers. Within other examples, however, these positions may be determined such that the objects have minimal contact.

At the same time or at different times, the control system may then actuate each pair of gripping fingers to grasp their respective objects. Accordingly, at block 904, the control system causes the first pair of gripping fingers to rotate to the determined first position. At block 906, after rotating the first pair of gripping fingers to the determined first position, the control system causes the first pair of gripping fingers to grasp the first object. Likewise, at block 908, the control system causing the second pair of gripping fingers to rotate to the determined second position. And at block 910, after rotating the second pair of gripping fingers to the determined second position, the control system causes the second pair of gripping fingers to grasp the second object.

Figure 10:
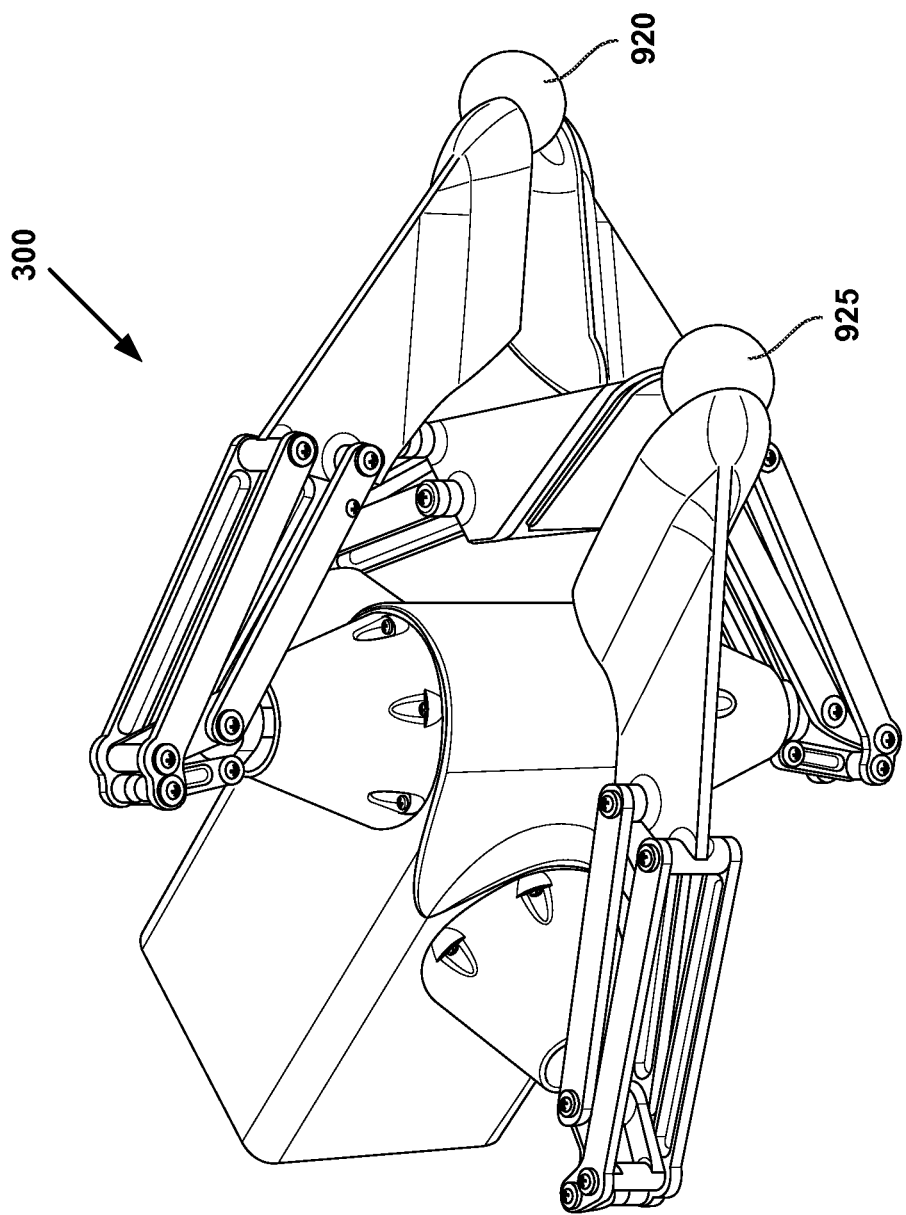
FIG. 10 illustrates a robotic gripper in operation, according to an example implementation.

By way of the method of FIG. 9, or by way of other methods, the gripper may pick up two objects and grasp them simultaneously. FIG. 10 illustrates gripper 300 grasping objects 920 and 925. As shown in FIG. 10, the pair of gripping fingers that is grasping object 920 is rotated off to the side from the pair of gripping fingers that is grasping object 925.

In an example implementation, the gripper may grasp a first object (e.g., object 920) and then rotate the first object out of the way so that the gripper can grasp a second object (e.g., object 925). Within examples, based on the location of the first object, the control system may determine a first position to which to rotate the first pair of gripping fingers. If the gripper is within the vicinity of the first object, the determined first position may be proximate to the first object. The control system may then rotate the first pair of gripping fingers to the first position and then grasp the first object. In turn, based on the dimensions of one or both of the first and second objects, the control system may determine a second position to which to rotate the first pair of gripping fingers about the longitudinal axis of the first axle, such as the position at which object 920 is being held as shown in FIG. 10. The control system may then rotate the first pair of gripping fingers to that second position while grasping the first object.

While the first pair of gripping fingers is at the second position and grasping the first object, the control system may orient the second pair of gripping fingers to enable them to grasp the second object in the environment. Based on the location of the second object in the environment and based on second position to which the first pair of gripping fingers rotated, the control system may then determine a third position to which to rotate the second pair of gripping fingers, perhaps a position proximate to the second object. Depending on the available space in the environment in which the robotic device is free to move, the robotic arm, wrist, and/or gripper may be moved in order to allow the second pair of gripping fingers to rotate to the third position. The control system may then rotate the second pair of gripping fingers to the third position and then grasp the second object.

In some implementations, the control system may actuate the gripper to pick up objects in a particular order. Within examples, the control system may determine a sequenced order in which to pick up the first and second objects. The control system may then cause the pairs of gripping fingers to each grasp their respective objects in the determined sequenced order. The sequenced order may be based on various considerations. For instance, the control system may determine the sequenced order based on the locations of the objects (e.g., if a first object is closer in proximity to the gripper and/or is less occluded than a second object, the control system may cause the gripper to pick up the first object before the second object). Additionally or alternatively, the control system may determine the sequenced order based on the dimensions of the objects (e.g., it may be easier for the gripper to pick up a small object with one pair of fingers, rotate that object out of the way, and then position the other pair of fingers to pick up a larger object, rather than pick up the larger object first).

Within additional examples, the control system may actuate the gripper to pick up objects in a particular order to facilitate efficient assembly of an object with multiple parts. For instance, if the robotic device is picking up parts and assembling them into a sub-assembly, it may be more efficient (e.g., involve less movement of the gripper and/or be faster) to do so in a particular order. By way of example, a particular part may require more movement of the fingers in order to be assembled, and accordingly the robotic device may assemble this particular part after the another part is positioned, thus allowing for greater movement of the gripper fingers holding the particular part. In some scenarios, the fingers may be customized to grasp specific objects for use in an industrial type application. For example, one pair of fingers may be shaped to hold a dowel pin and the other pair may be shaped to hold a disk. In this scenario, the robotic device may assemble a sub-assembly by inserting the dowel pin into a hole of a particular part and then placing the disk onto the pin. The robotic device can then grab a power tool such as a screwdriver and tighten screws to lock the dowel pin and disk. Furthermore, depending on what manner of assembly is most efficient, the robotic device can either grasp the dowel pin and disk at the same time and then grab the screwdriver once those parts are in place, or it could grab the dowel pin on its own and insert the dowel pin into the particular part and then grab the disk and screwdriver simultaneously.

In some implementations, each pair of gripping fingers may have a distinct dimension/shape so that each pair has a distinct maximum or minimum separation between its fingers. With such implementations, the control system may dedicate one pair of gripping fingers to gripping small objects and may dedicate the other pair of gripping fingers to gripping larger objects. Further, the control system may determine a sequenced order in which to pick up two distinct objects based on the dimensions of each object and may then pick up the objects in that order using the pairs of gripping fingers according to how they are dedicated.

After picking up one or more objects, the control system may reorient the first and/or second pairs of gripping fingers while holding the object(s) before disengaging one or both pairs of fingers and placing one or more of the object(s) at various locations. Again, the freedom of movement of each gripper finger may provide an advantage when the control system has to navigate the gripper around various obstacles and/or place objects in tight or otherwise hard to access locations.

Within examples in which the gripper grasps two objects, for instance, the control system may receive data indicative of (i) a first location at which to place the first object in the environment and (ii) a second location at which to place the second object in the environment. Based on those locations and further based on the dimensions of the first and second objects, the control system may determine respective orientations to which to rotate the first and/or second pairs of gripping fingers. Alternatively, the control system may determine that one pair of gripping fingers is already positioned at a suitable orientation at which to release its respective object and thus does not need to move to a new orientation. The control system may then cause one or both pairs of fingers to orient themselves in accordance with the determined orientation(s). After orienting a respective pair of fingers, or perhaps without orienting, the control system may cause that pair of fingers to disengage from its respective object and release that object at the respective location.

Figure 11:
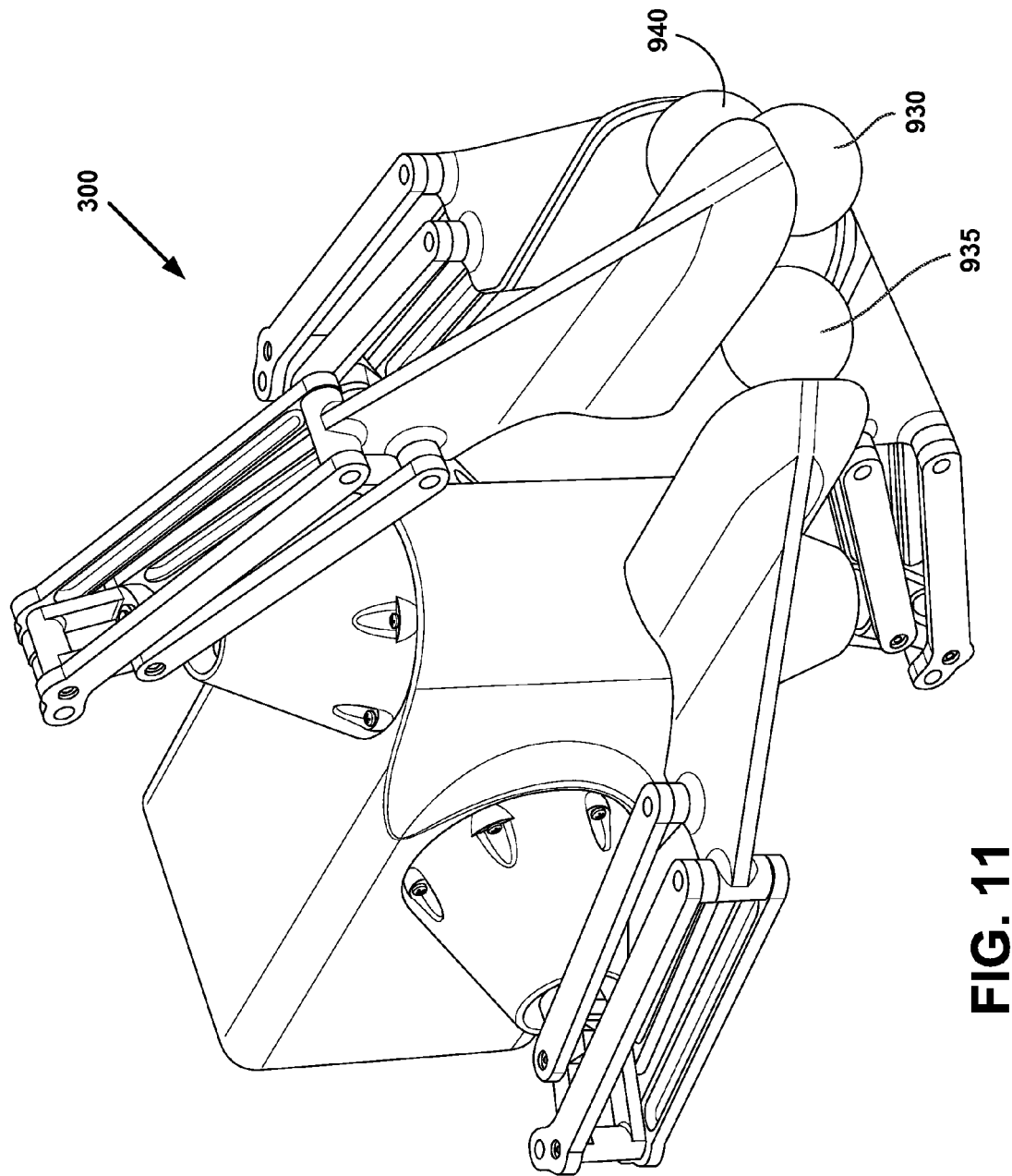
FIG. 11 illustrates a robotic gripper in operation, according to an example implementation.

The control system may grasp two or more objects in other ways as well. Within examples, the control system may receive data including a location of each object of a plurality in the environment and further including dimensions of each object. Based on this data, the control system may orient the first and second pairs of gripping fingers so that all of the objects are between at least one of the two pairs of gripping fingers and along one or more paths along which one or both pairs of gripping fingers move toward each other in order to engage in grasping objects. The control system may then cause both pairs of gripping fingers to move simultaneously toward the objects to squeeze the objects together from two directions. In this manner, each object of the plurality will be held between either (i) two fingers, (ii) a finger and another object, or (iii) two other objects. For instance, as shown in FIG. 11, the gripper 300 can grasp objects 930, 935, and 940 at once. Within other examples, the control system may cause the first pair of gripping fingers to grasp a first object, such as object 930, and then subsequently orient the gripper such that other objects, such as objects 935 and 940, are located between the gripping fingers of the second pair and the first object that is already being grasped. The control system may then cause the gripper to grasp at least one other object between the gripping fingers of the second pair of fingers and thus push the at least one other object against the first object. Within these and other examples, the control system may also determine the force at which the second pair of gripping fingers should move together in order to hold the objects without dropping the objects and/or without damaging the objects with excessive force.

Figure 12:
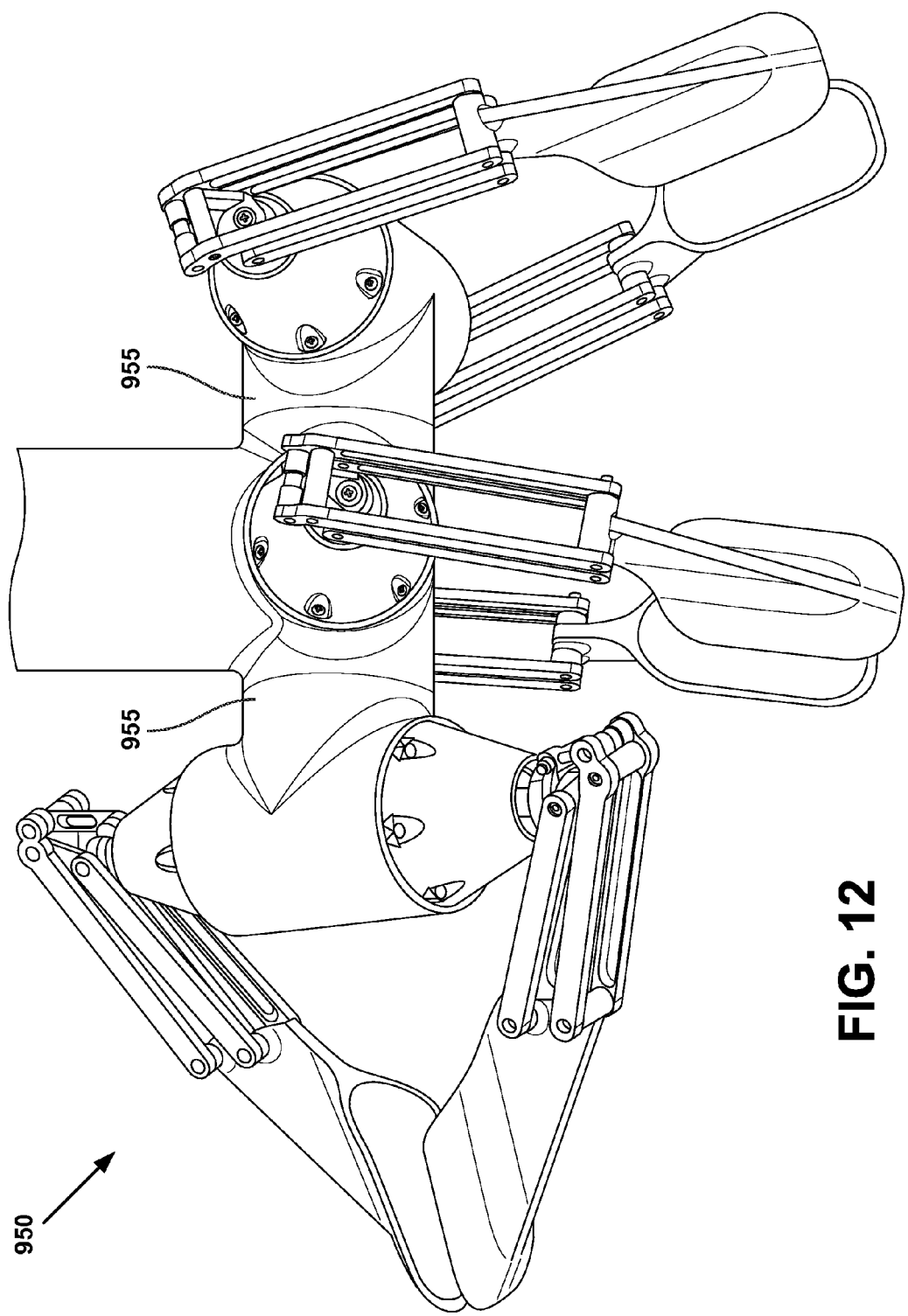
FIG. 12 illustrates a robotic gripper in operation, according to an example implementation.

FIG. 12 illustrates another type of robotic gripping apparatus 950. As shown, this gripping apparatus 950 may include an array of three gripping components similar to component 200 discussed above, although more than three components are possible in other implementations. These gripping components may be arranged in a row and may each have two degrees of freedom. Further, the outer two gripping components are shown to be coupled to rotatable mounts 955 so that the control system can actuate these rotatable mounts to rotate about an axis perpendicular to the respective large axles of each component. Such an apparatus may be used for various purposes. Within examples, each of the three pairs of gripping components may grasp one or more objects (not shown) so that the apparatus can carry at least three objects at the same time. Other examples are possible as well.

Some arrangements of a robotic gripper may include three or more gripping components similar to component 200 discussed above and may be actuated in a similar manner by a control system. For example, such an arrangement may include three respective axles along three distinct axes, where the three axes are offset from each other by 120 degrees. Further, such an arrangement may include three pairs of gripping fingers, where each pair of fingers can be independently actuated to (i) rotate about the longitudinal axis of the respective axle and (ii) move linearly (or non-linearly) toward/away from each other along an axis parallel (or not parallel) to the longitudinal axis of the respective axle. Such an arrangement may be used to grasp/brace/etc. one or more objects, such as three objects.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are operational entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
a first gripping component comprising a first rotatable axle oriented along a first longitudinal axis and further comprising a first pair of opposing gripping fingers with each gripping finger of the first pair being coupled to a respective end of the first axle; and
a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle,
wherein each axle is independently operable to rotate the respective pair of gripping fingers about the longitudinal axis of the respective axle, and
wherein each pair of gripping fingers is independently operable to move the gripping fingers of the respective pair toward and away from each other.

2. The apparatus of claim 1, further comprising a controller configured to actuate the first and second gripping components, wherein the controller comprises at least one processor and data storage comprising instructions executable by the at least one processor to cause the controller to perform operations comprising:
causing rotation of one or both pairs of gripping fingers about the longitudinal axis of the respective axle; and
causing movements of the gripping fingers of one or both pairs of gripping fingers toward each other so as to grasp one or more objects.

3. The apparatus of claim 2, wherein the operations further comprise:
causing the first pair of gripping fingers to grasp a first object; and
while the first pair of gripping fingers is grasping the first object, causing the second pair of gripping fingers to grasp a second object.

4. The apparatus of claim 1, further comprising:
a robotic arm;
wherein rotation of the respective pair of gripping fingers about the longitudinal axis of the respective axle includes rotation over a predetermined range of rotation such that the respective pair of gripping fingers avoids contact with the robotic arm.

5. The apparatus of claim 1, wherein each gripper finger of each pair of gripping fingers comprises a leadscrew that houses a portion of the respective axle, the leadscrew being configured to translate rotational motion of an actuator coupled to the leadscrew into linear motion of the leadscrew, and
wherein the linear motion of the respective leadscrews of a respective pair of gripping fingers causes the gripping fingers of the respective pair to move toward and away from each other.

6. The apparatus of claim 5, wherein each gripper finger of each pair of gripping fingers further comprises:
a tip comprising a gripping surface,
an axle cap that houses a respective end of the respective axle, the axle cap being configured to transmit torque from the rotational motion of the axle to the gripper finger,
a bushing surrounding an end of the leadscrew, the bushing being configured to translate the linear motion of the leadscrew into rotational motion of the tip, and
a plurality of linkages mounting the tip to the axle cap and to the bushing.

7. The apparatus of claim 5, further comprising a housing for each of the first and second gripping components,
wherein the housing contains at least a portion of a respective gripping component, including at least a portion of each leadscrew of the respective gripping component, and
wherein the housing is configured to contact the leadscrews of the respective gripping component and prevent rotation of the leadscrews.

8. The apparatus of claim 7, further comprising:
one or more sensors coupled to one or more of the gripping fingers of the apparatus, wherein the one or more sensors include one or both of (i) one or more force sensors and (ii) one or more cameras; and
wiring coupled to the one or more sensors and running through an interior of one or both of the housings and along at least a portion of a length of the one or more of the gripping fingers.

9. The apparatus of claim 8, wherein the respective housings are configured to seal the first and second gripping components and the wiring from outside exposure.

10. The apparatus of claim 1, wherein each gripping component further comprises an additional respective rotatable axle oriented along an axis parallel to the longitudinal axis of the gripping component,
wherein each of the additional respective axles is independently operable to rotate to cause the gripping fingers of the respective pair of gripping fingers to move toward and away from each other.

11. A robotic device comprising:
a first gripping component comprising a first rotatable axle oriented along a first longitudinal axis and further comprising a first pair of opposing gripping fingers with each gripping finger of the first pair being coupled to a respective end of the first axle;
a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle; and
a controller comprising at least one processor and data storage comprising instructions executable by the at least one processor to cause the controller to perform operations comprising:
causing rotation of one or both pairs of gripping fingers about the longitudinal axis of the respective axle; and
causing movements of the gripping fingers of one or both pairs of gripping fingers toward each other so as to grasp one or more objects.

12. The robotic device of claim 11, wherein the operations further comprise:

receiving data indicative of an object in an environment of the robotic device, the data including a location of the object in the environment;

based on the location of the object, determining positions to which to rotate each of the first and second pairs of gripping fingers with respect to each other such that the object is located between the respective fingers of each pair of gripping fingers;

causing the first and second pairs of gripping fingers to rotate to the determined positions; and causing movement of each pair of gripping fingers so as to grasp the object.

13. The robotic device of claim 11, wherein the operations further comprise:

receiving data indicative of a first and second object in an environment of the robotic device, the data including a location of first object in the environment, a location of the second object in the environment different from the location of the first object, and dimensions of each of the first and second objects;

based on the location of each of the first and second objects and further based on the dimensions of each of the first and second objects, determining (i) a first position to which to rotate the first pair of gripping fingers and (ii) a second position to which to rotate the second pair of gripping fingers;

causing the first pair of gripping fingers to rotate to the determined first position;

after rotating the first pair of gripping fingers to the determined first position, causing the first pair of gripping fingers to grasp the first object;

causing the second pair of gripping fingers to rotate to the determined second position; and after rotating the second pair of gripping fingers to the determined second position, causing the second pair of gripping fingers to grasp the second object.

14. The robotic device of claim 11, wherein the operations further comprise:

receiving data indicative of a first and second object in an environment of the robotic device, the data including a location of first object in the environment, a location of the second object in the environment different from the location of the first object, and dimensions of each of the first and second objects;

based on the location of the first object, determining a first position proximate to the first object to which to rotate the first pair of gripping fingers;

causing the first pair of gripping fingers to rotate to the determined first position;

after rotating the first pair of gripping fingers to the determined first position, causing movement of the first pair of gripping fingers so as to grasp the first object;

based on the dimensions of one or both of the first and second objects, determining a second position to which to rotate the first pair of gripping fingers about the longitudinal axis of the first axle;

causing the first pair of gripping fingers to rotate to the determined second position while grasping the first object;

based on the location of the second object and the determined second position to which the first pair of gripping fingers rotated, determining a third position proximate to the second object to which to rotate the second pair of gripping fingers;

causing the second pair of gripping fingers to rotate to the determined third position; and after rotating the second pair of gripping fingers to the determined third position, causing movement of the second pair of gripping fingers so as to grasp the second object.

15. The robotic device of claim 11, wherein the operations further comprise:

receiving data indicative of a plurality of objects in an environment of the robotic apparatus, the data including a location of each object of the plurality in the environment and further including dimensions of each object of the plurality;

based on the location and dimensions of each object, determining positions to which to rotate each of the first and second pairs of gripping fingers such that the plurality of objects are located between the respective fingers of each pair of gripping fingers;

causing the first and second pairs of gripping fingers to rotate to the determined positions; and after rotating the first and second pairs of gripping fingers to the determined positions, causing the first and second pairs of gripping fingers to simultaneously move together along the respective axes to grasp the plurality of objects.

16. The robotic device of claim 11, wherein the operations further comprise:

receiving data indicative of an elongated object in an environment of the robotic apparatus, the data including a location of the elongated object in the environment and further including dimensions of the elongated object;

based on the location and the dimensions of the elongated object, determining a first position at which to orient the first pair of gripping fingers such that the elongated object is located between the first pair of gripping fingers and located lengthwise along an axis substantially perpendicular to a path along which the first pair of gripping fingers moves;

causing the first pair of gripping fingers to move to the determined first position;

after moving the first pair of gripping fingers to the first position, causing the first pair of gripping fingers to grasp the elongated object;

based on the dimensions of the elongated object, determining a second position along a length of the elongated object at which to orient the second pair of gripping fingers to brace the elongated object; and while the first pair of gripping fingers are grasping the elongated object, causing the second pair of gripping fingers to move to the determined second position and to brace the elongated object.

17. A method for actuating a robotic apparatus comprising (i) a first gripping component comprising a first rotatable axle oriented along a first longitudinal axis and further comprising a first pair of opposing gripping fingers with each gripping finger of the first pair being coupled to a respective end of the first axle and (ii) a second gripping component comprising a second rotatable axle oriented along a second longitudinal axis substantially perpendicular to the first longitudinal axis of the first axle and further comprising a second pair of opposing gripping fingers with each gripping finger of the second pair being coupled to a respective end of the second axle, the method comprising:

receiving, at a control system configured to actuate the robotic apparatus, data indicative of distinct locations of a first and second object in an environment of the robotic apparatus and further indicative of dimensions of each of the first and second object;

based on the locations and dimensions of the first and second objects, determining respective orientations of each of the first and second pairs of gripping fingers to which to rotate the first and second pairs of gripping fingers about the longitudinal axes of the respective axles, wherein the respective orientations are orientations such that the first pair of gripping fingers will grasp the first object and the second pair of gripping finger will grasp the second object without contact between the first and second objects;

causing the first pair of gripping fingers to rotate to the respective orientation determined for the first pair;

after rotating the first pair of gripping fingers to the respective orientation, causing movement of the first pair of gripping fingers toward each other so as to grasp the first object;

causing the second pair of gripping fingers to rotate to the respective orientation determined for the second pair; and after rotating the second pair of gripping fingers to the respective orientation, causing movement of the second pair of gripping fingers toward each other so as to grasp the second object.

18. The method of claim 17, further comprising:

based on the locations and dimensions of the first and second objects, determining a sequenced order in which to pick up the first and second objects, wherein causing the first pair of gripping fingers to grasp the first object and causing the second pair of gripping fingers to grasp the second object comprises causing the first and second pair of gripping fingers to grasp the first and second object in the determined sequenced order.

19. The method of claim 17, further comprising:

receiving data indicative of (i) a first location at which to place the first object in the environment and (ii) a second location at which to place the second object in the environment;

based on the first and second locations and further based on the dimensions of the first and second objects, determining additional respective orientations of each of the first and second pairs of gripping fingers to which to rotate the first and second pairs of gripping fingers about the longitudinal axes of the respective axles;

causing the first pair of gripping fingers to rotate to the additional respective orientation determined for the first pair;

after rotating the first pair of gripping fingers to the additional respective orientation, causing movement of the first pair of gripping fingers away from each other so as to release the first object at the first location;

causing the second pair of gripping fingers to rotate to the additional respective orientation determined for the second pair; and after rotating the second pair of gripping fingers to the additional respective orientation, causing movement of the second pair of gripping fingers away from each other so as to release the second object at the second location.

20. The method of claim 17, wherein each gripper finger of each pair of gripping fingers of the robotic apparatus comprises a leadscrew that houses a portion of the respective axle, the leadscrew being configured to translate rotational motion of an actuator coupled to the leadscrew into linear motion of the leadscrew, and wherein the linear motion of the respective leadscrews of a respective pair of gripping fingers causes the gripping fingers of the respective pair to move toward and away from each other.

* * * * *